US007250962B2

(12) United States Patent
Ogino et al.

(10) Patent No.: US 7,250,962 B2
(45) Date of Patent: Jul. 31, 2007

(54) RECORDING SHEET AND IMAGE RECORDING METHOD USING THE SAME

(75) Inventors: Takashi Ogino, Ebina (JP); Kiyoshi Hosoi, Ebina (JP); Chizuru Koga, Ebina (JP); Tsukasa Matsuda, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 282 days.

(21) Appl. No.: 10/971,788

(22) Filed: Oct. 25, 2004

(65) Prior Publication Data

US 2005/0104947 A1 May 19, 2005

(30) Foreign Application Priority Data

Nov. 17, 2003 (JP) ............................. 2003-386591
Jul. 14, 2004 (JP) ............................. 2004-206848

(51) Int. Cl.
*B41J 2/435* (2006.01)
*B32B 23/02* (2006.01)

(52) U.S. Cl. ....................................... 347/264; 428/191

(58) Field of Classification Search ........ 347/101-106, 347/228, 262, 264; 428/32.1, 32.2, 171, 428/191, 537.5; 162/135, 129, 134, 157.6; 430/124, 157
See application file for complete search history.

(56) References Cited

U.S. PATENT DOCUMENTS 5,738,759 A * 4/1998 Kitazawa et al. ........... 162/135
6,153,310 A 11/2000 Kato
6,720,125 B2 * 4/2004 Nakamura et al. .......... 430/157
7,074,538 B2 * 7/2006 Hosoi et al. ................ 430/124

FOREIGN PATENT DOCUMENTS

| | | |
|---|---|---|
| JP | A 62-144986 | 6/1987 |
| JP | A 3-38375 | 2/1991 |
| JP | A 3-38376 | 2/1991 |
| JP | A 3-199081 | 8/1991 |
| JP | A 7-276786 | 10/1995 |
| JP | A 9-119091 | 5/1997 |
| JP | A 10-46498 | 2/1998 |
| JP | A 10-278409 | 10/1998 |
| JP | A 11-115304 | 4/1999 |
| JP | 2000235276 A * | 8/2000 |
| JP | 2000250250 A * | 9/2000 |
| JP | B2 3127114 | 11/2000 |
| JP | B2 3172298 | 3/2001 |
| JP | A 2002-155494 | 5/2002 |
| JP | A 2002-201597 | 7/2002 |
| JP | A 2002-348798 | 12/2002 |

* cited by examiner

*Primary Examiner*—Hai Pham
(74) *Attorney, Agent, or Firm*—Oliff & Berridge, PLC

(57) ABSTRACT

A recording sheet including a cellulose pulp, wherein a water retention value C of the sheet according to the following formula (1) is 50 to 100% and a wet tensile strength residual ratio R of the sheet in CD according to the following formula (2) is 5 to 20%:

Water retention value $C(\%)=\{(A-B)/B\}100$ Formula (1)

Wet tensile strength residual ratio $R(\%)$ in $CD=(Sw/S)\times 100$. Formula (2)

20 Claims, 1 Drawing Sheet

RECORDING SHEET AND IMAGE RECORDING METHOD USING THE SAME

CROSS-REFERENCE TO RELATED APPLICATION

This application claims priority under 35 USC 119 from Japanese patent Application Nos. 2003-386591 and 2004-206848, the disclosures of which are incorporated by reference herein.

BACKGROUND OF THE INVENTION

1. Field of the Invention

The present invention relates to a recording sheet, an ink-jet recording method using the sheet, and an electrophotographic image recording method using the sheet.

2. Description of the Related Art

An ink-jet recording system has characteristics such as easy colorization, reduced consumption of energy, low noise during recording and low manufacturing cost of a printer. Thus, wide attention is directed to this system. Further, improvements in image quality, high-speed operation and reliability have been made in recent years. Printing is frequently made on plain sheet and it is therefore very important to improve recording quality on plain sheet.

In conventional major ink-jet printers, black ink includes a pigment as a colorant and has low penetrability in recording sheets (hereinafter simply referred to as "sheet") and color inks use dyes as colorants and have high penetrability in recording sheets. These inks are selected in order to improve image quality of black characters and prevent mixed color bleeding.

Therefore, when the color ink, which have high penetrability in sheets, are used to print an image with high recording density, heavy curl and cockle of a recording sheet occur immediately after printing, leading to jamming in a printer and the rubbing of the image part. Moreover, when duplex printing is conducted, the time required for improvement of the curl and the time required for drying of ink reduces print productivity extremely. Further, when an image having high recording density is printed, heavy curl and cockle occur after air drying of the image. It is therefore impossible to satisfy high quality, suppression of curl and cockle simultaneously at high levels.

The following methods have been proposed to prevent the aforementioned curl and cockle after printing: a method in which a sheet obtained by sheet-making is humidified once to lighten the stress of sheet, thereby reducing curl and cockle (see, for example, Japanese Patent Application Laid-Open (JP-A) No. 3-38375), a method in which the in-water ductility of sheet in a CD is limited to reduce curl and cockle (see, for example, JP-A No. 3-38376), a method in which the ratio of the in-water ductility of sheet in a MD to the in-water ductility of sheet in a CD is designed to be 1.3 or less to reduce curl and cockle (see, for example, JP-A No. 3-199081), a method in which the in-water ductility of a ink-discharged part in a moving direction is designed to be 2.0% or less to reduce curl and cockle (see, for example, JP-A No. 7-276786), a method in which the in-water ductility in a CD is designed to be 1.8% or less to suppress curl and cockle (see, for example, JP-A No. 10-46498) and a method in which the amount of a pigment contained in a support is designed to be 5 to 35% by weight and the internal binding strength of a recording sheet (recording sheet) is designed to be 150 to 455 g/cm to suppress the cockle of a coat-type ink-jet recording sheet (see, for example, JP No. 3172298).

In these methods described in the aforementioned documents, it is reported that curl and cockle are suppressed. However, when ink having high penetrability into a recording sheet is used and a lot of ink is discharged or printing speed is so high that the amount of ink to be discharged per time is increased, heavy curl occurs and the sheet is impractical for document use.

Also, the method described in U.S. Pat. No. 3,172,298 attempts to reduce swelling after printing by limiting the internal binding strength of a recording sheet having an ink receiving layer within a specified rang. However, the limitation to the internal binding strength alone fails to obtain a sufficient effect on the prevention of curl, cockle and swelling. Particularly, when ink having high penetrability into a recording sheet is used and a lot of ink is discharged or printing speed is so high that the amount of ink to be discharged per time is increased, heavy curl occurs and the sheet is impractical for document use.

In order to suppress curl and cockle after air drying of a sheet, there is proposed a method in which the irreversible shrink ratios in a MD and in a CD when environmental relative humidity is changed, is made to fall within a specified range to thereby suppress curl and cockle after the drying (see, for example, JP No. 3127114). However, when there is no limitation on the penetration of ink into a recording sheet and ink having high penetrability into a recording sheet is used and a lot of ink is discharged, the ink penetrates into the inside of the recording sheet. As a result, an absolute amount of fibers which are to shrink after drying is increased as a whole, causing an increase in curl after the drying, leading to only insufficient effects.

On the other hand, a method is proposed in which an ester type nonionic surfactant having an HLB of 11 or more is compounded in an ink receiving layer to improve image quality (see, for example, JP-A No. 10-278409). However, this surfactant is highly hydrophilic and therefore, the hydrophilic groups of a base material (base sheet) cannot be coated with the hydrophobic groups of the surfactant. When a large amount of ink is used, a recording sheet is easily deformed, leading to heavy curl and the sheet is impractical as a document.

Also, a method is proposed in which a surfactant having an HLB ranging from 3 to 12 is compounded in an ink receiving layer on the film surface to improve image quality (see, for example, JP-A No. 62-144986). However, even if the above technologies are applied to plain sheet, the amount of the surfactant is as low as less than 0.1% by weight and therefore the hydrophilic groups of a base material cannot be coated with the hydrophobic groups of the surfactant. Particularly, when ink having high penetrability into a recording sheet is used and a lot of ink is discharged or printing speed is so high that the amount of ink to be discharged per time is increased, large cockle occurs and the sheet impractical as a document.

Also, a method is proposed in which dry oxidized starch is subjected to size press treatment for preventing curl (see, for example, JP-A No. 2002-348798). However, when a lot of ink is used for printing, the above technologies cause water in the ink to elongate a base material, thus heavy curl occurs and the sheet is impractical as a document.

Further, in order to improve image quality in an ink-jet system, an ink receiving layer containing a silanol modified polyvinyl alcohol (PVA), 11 to 20% by weight nonionic surfactant and a synthetic amorphous silica as a filler is proposed (see, for example, JP-A No. 11-115304). In this method, there is no teaching on the HLB of a surfactant and also, since the hydrophilicity of the surfactant is high whose example is the surfactant used is in the examples with the HLB of 14, the hydrophilic groups of the base material cannot be coated with the hydrophobic group of the surfactant when this method is applied to a sheet derived from cellulose pulp. The above technologies likewise allows water in the ink to elongate a base material, thus heavy curl occurs and the sheet is impractical as a document.

Also, a method in which a bulky-softening agent having a HLB of 6 or less is compounded in a print sheet is proposed to improve the bulkiness-softness. However, a surfactant having a HLB of 6 or less, particularly a surfactant having a HLB of 4 or less, has poor dispersibility. Consequently, the hydrophilic groups of a base material cannot be coated with the hydrophobic groups of the surfactant and the absolute amount of fibers which stretch and shrink increases, and heavy curl occurs. As a result, only insufficient effects are obtained (see, for example, JP-A No. 2002-155494).

Further, a method is proposed in which, in an electrophotographic system, water retention and freeness of the pulp obtained by disintegrating a recording sheet is adjusted within ranges of 80 to 110% and 480 to 600 ml respectively to improve reliability (see, for example, JP-A No. 9-119091). In this method, curl can be reduced by controlling the water retention value of pulp. However, sheet strength is reduced and there is therefore the case where sheet powder is easily produced in an electrophotographic printer and a copying machine, and low stiffness causes jamming. Also, when this method is applied to an ink-jet system, owing to vaporization of water in ink, heavy curl occurs at printing and drying.

Also, in an ink-jet system, a method is proposed (see, for example, JP-A No. 2002-201597) which aims at shape stabilization by impregnation with a cellulose cross-linking agent. In this method, however, if the degree of bonds between fibers becomes excessive by the cross-linking treatment, heavy curl occurs as water in ink vaporize when a sheet is dried after printing. Also, this technology cannot suppress deformation of a sheet immediately after printing and jamming is likely to occur in a machine. Moreover, when this sheet is applied to an electrophotographic copying machine and printer, residual formaldehyde is vaporized in a fixing unit and there is a fear that not only the machine is contaminated but also the vapor is harmful to people who touch the sheet.

SUMMARY OF THE INVENTION

The invention was made considering the above problems of the prior art.

A first aspect of the invention is to provide a recording sheet comprising a cellulose pulp, wherein a water retention value C of the sheet according to the following formula (1) is 50 to 100% and a wet tensile strength residual ratio R of the sheet in CD according to the following formula (2) is 5 to 20%:

$$\text{Water retention value } C(\%)=\{(A-B)/B\}\times 100 \quad \text{Formula (1)}$$

$$\text{Wet tensile strength residual ratio } R(\%) \text{ in } CD=(Sw/S)\times 100 \quad \text{Formula (2)}$$

wherein in Formula (1), A represents a weight (g) of the sheet in wet state after the sheet is subjected to centrifugal dehydration and B represents an absolute dry weight (g) of the sheet; in Formula (2), Sw represents a wet tensile strength (kN/m) of the sheet and S represents a tensile strength (kN/m) of the sheet in dry state.

A second aspect of the invention is to provide an ink-jet image recording method comprising discharging ink droplets onto the above recording sheet to form an image on the sheet.

A third aspect of the invention is to provide an electrophotographic image recording method comprising: charging a surface of an electrostatic latent image holding member; exposing the surface of the electrostatic latent image holding member to form an electrostatic latent image; developing the electrostatic latent image formed on the surface of the electrostatic latent image holding member by using an electrostatic latent image developing agent to form a toner image; transferring the toner image onto a surface of the above recording sheet; and fixing the toner image on the surface of the recording sheet.

DESCRIPTION OF THE PRESENT INVENTION

Figure 1:
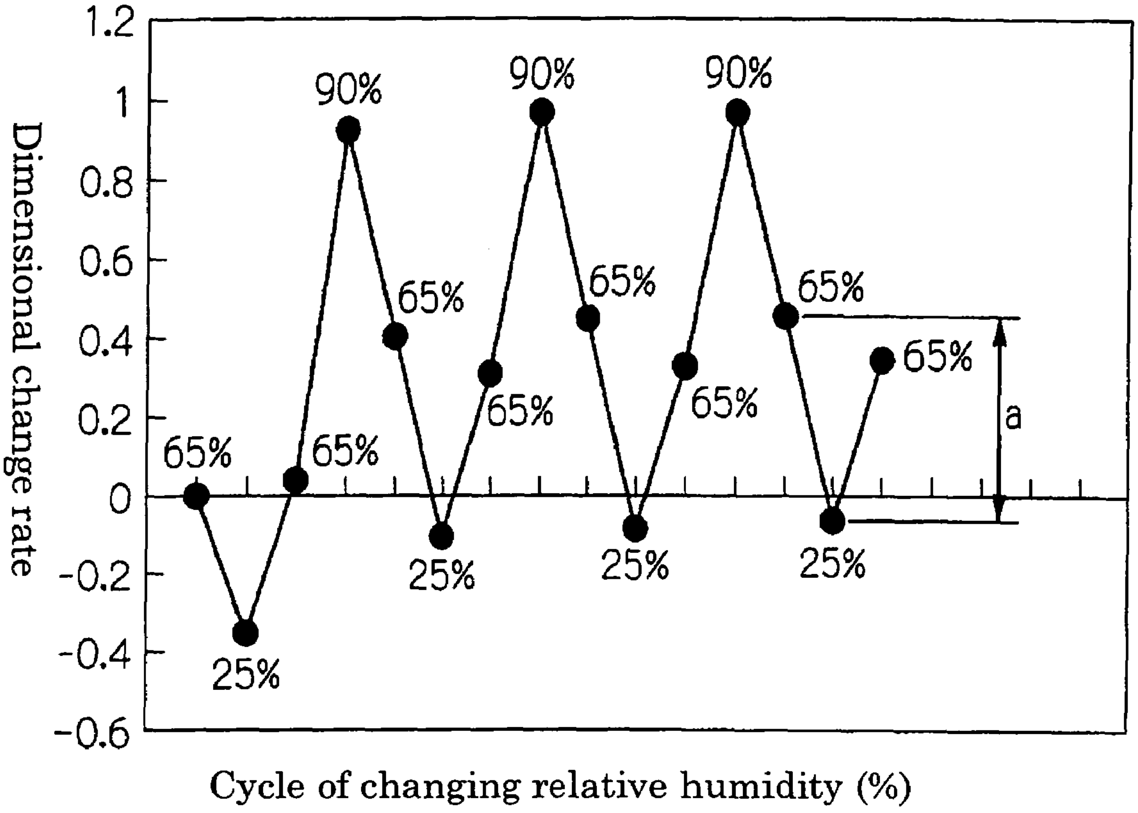
FIG. 1 is a graph for explaining the definition of a degree of CD shrink in the present invention.

The present inventors have made earnest studies as to a method for suppressing the curl of plain sheet which is caused immediately after printing and for improving the cockle of plain sheet, thereby ensuring duplex printing, and further for suppressing curl and cockle after air drying of the sheet.

As a result, the inventors have confirmed that the curl and cockle which occur immediately after printing are caused by the rapid elongation of a fiber layer which absorbed water in an aqueous ink. The inventors have also confirmed that the curl and cockle after the air drying of the sheet are caused by the shrink of the fiber layer which has absorbed ink. The inventors have further confirmed that a higher rate of penetration of ink in the direction of sheet thickness and a deeper penetration of the ink worsen curl and cockle after air drying of the sheet.

Based on these results, the present inventors have made earnest studies as to shrink transferability caused by water absorption and desorption of a fiber layer which has absorbed ink. As a result, the inventors have found that the shrink transferability is intimately related with the degree of shrink of the sheet; by reducing the degree of shrink, it is possible to lower the shrink transferability. Accordingly, curl and cockle immediately after printing can be suppressed and curl and cockle after air drying of the sheet can be suppressed, too. The inventors have also found that if the surface and/or inside of a sheet include(s) a surfactant having an HLB within a specific range and/or a compound having one reactive group which reacts with an active hydrogen group of a carboxyl group or a hydroxyl group, the hydroxyl groups of cellulose in the sheet is blocked by these groups. As a result, formation of hydrogen bonds is inhibited, the degree of shrink is reduced, and curl and cockle are suppressed.

The inventors have also confirmed that the curl and cockle which occur after air drying of the sheet is caused by the following reactions: fibers which have absorbed water in aqueous ink freely reconstruct bonds between the fibers when the fibers dry; thus only the part into which ink has penetrated shrinks to a size smaller than its original size; and as a result, the curl occurs.

Based on these results, the inventors have made earnest studies concerning dimensional stability with respect to desorption of water in a fiber layer which has absorbed ink. As a result, the inventors have found that formation of bonds other than hydrogen bonds between fibers is closely related to the dimensions before and after printing. Therefore, it is possible to suppress the curl and cockle after air drying of the sheet by generating bonds other than hydrogen bonds between fibers, since the bonds are not cut by water. When the sheet is treated with a compound which can react with hydroxyl groups of cellulose of the sheet, bonds other than hydrogen bonds are formed between or inside of fibers and provides dimensional stability. Accordingly, the curl and cockle after the air drying of the sheet can be suppressed.

When the sheet is treated with a surface sizing agent which is an essential component of the sheet and the aforementioned curl reducing compound at the same time, the following method can be employed. The surfactant having an HLB within a specified range and the compound (sometimes referred to as "compound P" hereinafter) having one reactive group which reacts with an active hydrogen group of a carboxyl group or a hydroxyl group can exert a strong influence on deformation of the sheet immediately after printing. The compound (sometimes referred to as "compound Q" hereinafter) which can react with a hydroxyl group of cellulose of the sheet can exert a strong influence on deformation of the sheet after the air drying of the sheet. Simultaneous use of the surfactant, the compound P, and the compound Q in addition to the surface sizing agent is effective because a combined effects of respective compounds are hardly inhibited by the surface sizing agent. Therefore, the curl and cockle immediately after printing and the curl and cockle after the air drying of the sheet can both be suppressed dramatically with the simultaneous use.

When the sheet of the invention is used in electrophotographic copying machines and printers, the curl and cockle can be suppressed. Moreover, since the sheet has an improved strength, jamming can also be reduced. Even when the surface sizing agent is used simultaneously, the effects of the invention is not largely inhibited and generation of sheet powder can also be suppressed.

Regarding image quality, color development is likely to be inhibited by the nonionic surfactant added to reduce curl. However, when the above techniques are applied, the color development can be improved by incorporating a cationic material into the sheet since the cationic material has an opposite ionicity to that of ink or an ink dispersant. Also, the electric resistance characteristics of the sheet is important to secure image transferability in an electrophotographic system. In the invention, particularly, the surfactant and cationic material are added, which can change the electric characteristics. Therefore, the inventors of the present invention have investigated the range of the electric characteristics ensuring image transferability in an electrophotographic system and found the range of the electric characteristics in which an image can be transferred stably. In this way, a sheet has been developed which can be used in both the electrophotographic system and the ink-jet system.

The invention will be described in detail with the recording sheet and the image recording method as main subjects.

<Recording Sheet>

The recording sheet of the invention is prepared by using cellulose pulp as its raw material, wherein the water retention value C of the sheet represented by the following equation (1) is in the range of 50 to 100% and the wet tensile strength residual ratio R of the sheet in a CD represented by the following equation (2) is in the range of 5 to 20%.

$$\text{Water retention value } C(\%)=\{(A-B)/B\}\times 100 \qquad \text{Equation (1)}$$

$$\text{Wet tensile strength residual ratio } R(\%) \text{ in a } CD=(Sw/S)\times 100 \qquad \text{Equation (2)}$$

In the above equation (1), A represents the weight (g) of a wet sheet after centrifugal dehydration is finished, B represents the absolute dry weight (g) of the sheet. In the above equation (2), Sw represents the wet tensile strength (kN/m) of the sheet and S represents the tensile strength (kN/m) of the sheet in dry state.

The recording sheet having the above characteristics according to the invention has the following effects when used to print by an ink-jet recording system: (1) curl and cockle which occur immediately after printing can be suppressed and thus duplex printing is possible; (2) curl and cockle which occur after air drying of the sheet can be suppressed; (3) printing can be conducted without jamming of the sheet in the printer since the sheet strength immediately after printing can be maintained high.

Besides the above, in the case of printing in an electrophotographic system, (4) curl and cockle which occur immediately after printing can be suppressed, (5) curl and cockle which occur after the air drying of the sheet can be suppressed and also, (6) since sheet strength immediately after printing can be maintained high, jamming in the machine can be prevented and since a lot of surface sizing agent can be used, the occurrence of sheet powder can be suppressed to suppress relevant troubles. Specifically, it has been found that both the suppression of curl and cockle after printing and the retention of sheet strength can be accomplished by fulfilling the requirements of the formulae (1) and (2).

On the contrary, in the case of conventional sheets used in ink-jet recording systems or electrophotographic recording systems, the water retention value C defined in the invention is 100% or higher and heavy curl occurs. When the water retention value is reduced to less than 100% by, for example, lowering the degree of beating, curl is reduced. However, at the same time, the wet tensile strength residual ratio R defined in the invention is less than 5% in that case and the sheet strength immediately after printing is insufficient; therefore, jamming occurs in the machine, sheet powder occurs easily and accumulates in the machine, thus relevant troubles are likely to occur.

Also, the wet tensile strength residual ratio R (%) of conventional sheets is generally less than 5%. When the ratio is elevated to 5% or higher by adding, for example, a wet-sheet-strength enforcing agent, the water retention value is 100% or higher. In this case, since degree of hydrogen bonds between fibers is high, curl immediately after printing is extremely heavy and jamming of sheets in the machine is likely to occur. Therefore, suppression of curl immediately after printing and after air drying, and suppression of troubles in the machine cannot be achieved at the same time.

Here, the characteristic values used herein will be explained first.

The water retention value of the recording sheet in the invention is measured by a measuring method according to JAPAN TAPPI No. 26: 2000 (the conditions are partly changed). JAPAN TAPPI No. 26: 2000 is incorporated herein by reference. With regard to specific conditions to be changed, a sheet which was cut into 1 cm×1 cm corresponding to an absolute dry weight of 0.5 g and dipped in pure water for 10 minutes is used as a sample in place of a pulp suspension solution corresponding to an absolute dry weight of 0.5 g; and before centrifugation, the above sheet is so placed in a metal cup strainer that the strainer is well-balanced and the strainer is set to a centrifugal precipitation tube. The other procedures and conditions than the above are the same as in JAPAN TAPPI No.26: 2000.

The water retention value C is calculated according to the following equation (1).

$$\text{Water retention value } C(\%)=\{(A-B)/B\}\times 100 \qquad \text{Equation (1)}$$

In the above equation (1), A represents the weight (g) of a wet sheet piece after centrifugal dehydration is finished and B represents the absolute dry weight (g) of the sheet.

The wet tensile strength residual ratio R of the sheet in a CD is calculated from the following equation (2), employing a measuring method according to JIS P 8135 (with minor limitations and modifications). JIS P8135 is incorporated herein by reference.

$$\text{Wet tensile strength residual ratio } R(\%) \text{ in a } CD=(Sw/S)\times 100 \qquad \text{Equation (2)}$$

In the above equation (2), Sw represents the wet tensile strength (kN/m) and S represents the tensile strength (kN/m) of the sheet in dry state.

The minor limitations and modifications are: the tensile strength is measured by a vertical direction tension method (JIS P8135, 7.2.1); and when the wet tensile strength Sw is measured, the length of the dipped part of the test piece is 30 mm, the dipping time is 10 seconds, an aqueous solution is used as the dipping solution in place of water, the aqueous solution being prepared by adding 2% by weight of a nonionic surfactant SURFINOL 465 (trade name, manufactured by Nisshin Chemicals Co., Ltd.) as a penetration promoter to deionized water and having a composition close to ink used for actual ink-jet printing, and excess water on the test sheet is absorbed by Kimwipe after the sheet is dipped to measure the tensile strength. Also, the tensile strength S in dry state is measured without dipping the test sheet in a solution after the sheet is allowed to stand in a 23° C. and 50% RH environment overnight. The both tensile strengths are measured in a 23° C. and 50% RH environment. The other procedures and conditions than these limitations and modifications are the same as in JIS P 8135.

The reason why the aqueous solution is used as a dipping solution in measurement of the test sheet is that the result has closer relationship with actual curl than when water is used as a dipping solution since the composition of the aqueous solution is close to that of ink. Also, the "CD" means a direction across a recording sheet which is orthogonal to the flow direction of a recording sheet at manufacture of the sheet. When the tensile strength of the recording sheet is measured, the length in a direction across the sheet which is orthogonal to the flow direction of the sheet at manufacture of the sheet is measured.

As mentioned above, the water retention value C of the invention is preferably in the range of 50 to 100%, more preferably in the range of 60 to 90% and still more preferably in the range of 70 to 85%. When the water retention value is less than 50%, the water retention ability is too low. Therefore, the bleeding of ink easily occurs when printing in an ink-jet system because water absorbing properties are inferior. When the water retention value exceeds 100%, curl is heavy and jamming of the sheet occurs in the printing machine.

The wet tensile strength residual ratio R in the invention has to be in the range of 5 to 20%, preferably in the range of 8 to 17% and more preferably in the range of 10 to 15%. When the wet tensile strength residual ratio R is less than 5%, the strength of the sheet upon penetration of ink is too low. In that case, jamming of the sheet in the printing machine occurs at ink-jet printing. Also, curl after drying subsequent to printing is heavy and the sheet is impractical for document use. On the other hand, when the ratio R exceeds 20%, the degree of bonds between fibers is high and curl is heavy in particular immediately after printing. Accordingly, jamming of the sheet in the printing machine occurs.

Moreover, in the invention, among recording sheets satisfying the requirements as to the above ranges of water retention value C and wet tensile strength residual ratio R, recording sheets having a Young's modulus $(N/mm^2)\times[\text{thickness (mm)}]^3$ of 2.0 to 10.0 N·mm and an air permeability of 10 to 100 s are particularly preferable.

Specifically, when the water retention value of the recording sheet is reduced from a usual value of 100% or higher to the range defined in the invention, the Young's modulus of the recording sheet is improved. The curl is remarkably suppressed when the Young's modulus $(N/mm^2)\times[\text{thickness (mm)}]^3$ is 2.0 to 10.0 N·mm.

The above Young's modulus $(N/mm^2)\times[\text{thickness (mm)}]^3$ is preferably in the range of 2.0 to 7.5 N·mm and more preferably in the range of 2.0 to 5.0 N·mm. If the Young's modulus $(N/mm^2)\times[\text{thickness (mm)}]^3$ is less than 2.0 N·mm, the stiffness of the recording sheet is insufficient and suppression of curl immediately after printing or after air drying is unlikely to be achieved. On the other hand, if the Young's modulus $(N/mm^2)\times[\text{thickness (mm)}]^3$ exceeds 10.0 N·mm, the above stiffness is too high, and problems concerning the transfer of the recording sheet in an image recording device are caused. Moreover, such a stiff sheet has problems also from the viewpoint of texture.

The above Young's modulus $(N/mm^2)\times[\text{thickness (mm)}]^3$ of a recording sheet is determined by measuring the tensile elastic modulus of the sheet in the CD of the sheet according to the method of JIS P 8113, which is incorporated herein by reference.

Moreover, as to the above air permeability, mixed color bleeding after printing is more likely to occur on a sheet having a higher air permeability. The mixed color bleeding occurs when the above air permeability exceeds 100 s. The occurrence of the mixed color bleeding can be prevented without impairing other characteristics if the air permeability is in the range of 10 to 100 s.

The above air permeability is preferably in the range of 10 to 50 s and more preferably in the range of 10 to 30 s. If the air permeability is less than 10 s, vacuum feeds plural sheets at the same time in an electrophotographic copying machine or a printer having a sheet feed mechanism utilizing the vacuum. On the other hand, if the air permeability exceeds 100 s, ink does not penetrate instantly after printing, giving rise to mixed color bleeding as mentioned above.

Here, the air permeability means J Tappi No. 5, Oken type permeability. J Tappi No. 5 is incorporated herein by reference.

Next, the structure of the recording sheet of the invention will be described.

In order to reduce the curl and cockle of the recording sheet after printing, it is necessary to lower the degree of hydrogen bonds between fibers as mentioned above. The degree of hydrogen bonds can be lowered by, for example, lowering the degree of beating. In this case, the water retention value C can also be decreased to 100% or less. However, at the same time, sheet strength is very low. Therefore, sheet jamming occurs in the printing machine and sheet powder easily occurs and accumulates in the machine. As a result, troubles are likely to occur. If polyacrylamide or the like is used in order to improve the wet strength, the water retention value C is also increased and the curl become heavier. As the result, sheet jamming occurs in the machine. In conclusion, no conventional recording sheets satisfy both requirements of retaining sheet strength and of suppressing curl. In other words, no conventional recording sheets satisfy the requirements the above ranges of the water retention value C and wet tensile strength residual ratio R.

To describe in more detail, hydroxyl groups in a material constituting a recording sheet usually form hydrogen bonds with one another (through a water molecule or without an intervening water molecule). Such hydrogen bonds are unstable because their bond lengths are elongated and shortened in accordance with a change in water content caused by variations in environmental temperature and humidity or penetration and/or drying of ink upon printing. The instability of bonds is considered to be the cause of a macro-scale change in the dimension of the recording sheet and of curl and cockle owing to the dimensional change.

For example, in the case of conventional recording sheets used in ink-jet recording system, the above formation of hydrogen bonds is not inhibited by substances in the recording sheets and also the number of hydrogen bonds is not limited either. It is therefore impossible to prevent a dimensional change caused by stretching/contraction, cleavage and reformation of unstable bonds. As a result, the aforementioned characteristics (1) to (3) cannot be satisfied simultaneously at a high level. It might be possible to inhibit the formation of the above hydrogen bonds by filling the spaces between fibers. In this case, however, absorption of ink in the recording sheet is also inhibited by this filling and bleeding is likely to be caused.

The present inventors have made earnest studies and, as a result, found that the aforementioned dimensional change can be suppressed by the following way: formation of the bonds between fibers is inhibited by adhering compounds described below to the recording sheet material (fibers) or reacting or cross-linking compounds described below with the recording sheet material; consequently, formation of hydrogen bonds is inhibited and dimensional change of the sheet is suppressed; therefore, curl and cockle can be finally prevented.

Specifically, a recording sheet satisfying the above characteristics can be obtained by the following two methods.

A first method comprises providing a sheet with a compound (compound P) having one reactive group that reacts with an active hydrogen group of a carboxyl group and hydroxyl group and/or a nonionic surfactant having a HLB of 6 or higher and lower than 11 in a total amount of 0.05 to 1.5 $g/m^2$.

The compound P and/or the nonionic surfactant may be incorporated into the recording sheet by mixing the substance(s) and the material of the sheet during production of the sheet or by coating the sheet with the substance(s) during production of the sheet so that each substance is adhered or bonded to pulp fibers inside of the recording sheet and positioned between the pulp fibers. Formation of the bonds between fibers is inhibited by the incorporation of the specific substances.

The above nonionic surfactant (hereinafter sometimes referred to as "surfactant R") has an HLB range preferably equal to or higher than 6 and lower than 11 and more preferably 7 to 9. When the HLB is above 11, the surfactant is highly hydrophilic; thus, cellulose in the base material is not sufficiently blocked by the surfactant and dimensional change of the sheet is not sufficiently inhibited. In that case, curl and cockle immediately after printing and curl and cockle after air drying are likely to be heavy. On the other hand, when the HLB is below 6, the dispersability of the surfactant is low and the surfactant cannot exist uniformly; as a result, the surfactant cannot inhibit the dimensional change sufficiently. There is therefore the case where curl and cockle immediately after the printing and curl and cockle after air drying are likely to be heavy as well.

Examples of the nonionic surfactant R usable in the invention include polyoxyethylene nonylphenyl ether, polyoxyethylene octylphenyl ether, polyoxyethylene dodecylphenyl ether, polyoxyethylene alkyl ethers, polyoxyethylene fatty acid esters, sorbitan fatty acid esters, acetyleneglycol ethyleneoxide adducts, polyoxyethylenesorbitan fatty acid esters, fatty acid alkylolamides, polyethyleneglycol polypropyleneglycol block copolymers, polyoxyethylene ethers of glycerin esters, and polyoxyethylene ethers of sorbitol esters.

Among these compounds, acetyleneglycol ethyleneoxide adducts are particularly preferable.

Also, examples of the above compound P may include monoglycidyl ethers, trimethylsilylating agents, acetic acid anhydride and chromium-based water repellents. Among these compounds, monoglycidyl ethers are preferably used.

Examples of the monoglycidyl ethers include allyl glycidyl ethers, 2-ethylhexyl glycidyl ether, phenyl glycidyl ether, phenol $(EO)_5$ glycidyl ether (EO represents an ethylene oxide), p-tert-butylphenyl glycidyl ether, higher alcohol glycidyl ethers, butyl glycidyl ether, cresyl glycidyl ether and butoxypolyethylene glycol monoglycidyl ethers. Also, as the trimethylsilylating agent, chlorosilanes, alkoxysilanes, silazanes or the like may also be used. Also, as the esterifying agent, acetic acid anhydride may be used. Among these compounds, a butoxypolyethylene glycol monoglycidyl ether is particularly preferable.

Also, the total amount of the surfactant R and/or the compound P is preferably in the range of 0.05 to 1.5 $g/m^2$, more preferably in the range of 0.1 to 1.2 $g/m^2$ and still more preferably in the range of 0.2 to 1.0 $g/m^2$.

If the amount is less than 0.05 $g/m^2$, cellulose in the base material is not sufficiently blocked by the surfactant R and/or the compound P; consequently, the dimensional change of the recording sheet is not sufficiently inhibited and curl and cockle are likely to be heavy. On the other hand, if the amount exceeds 1.5 $g/m^2$, the water retention value of the sheet is low and water absorbing properties thereof is insufficient; consequently, at printing in an ink-jet recording system, problems are likely to arise such as intercolor bleed and setoff.

In the invention, it is preferable to add a compound (hereinafter sometimes referred to as "compound S") having two or more reactive groups that react with an active hydrogen group of a carboxyl group or a hydroxyl group in addition to the compound P in an amount range from 0.03 to 1.0 $g/m^2$ in order to reduce curl and cockle. Incorporation of such a compound makes it possible to keep the above wet tensile strength residual ratio R within the above range in a more stable manner. In other words, the above wet tensile strength residual ratio can be controlled within a range of 5 to 20% and curl after air drying is particularly reduced by incorporation of the compound. Use of the compound in combination with the surfactant R and the compound P makes it possible to keep the sheet strong while suppressing curl. Also, because a surface sizing agent can be used to a certain extent at the same time, the generation of sheet powder can also be suppressed.

The above compound (S) may be, for example, a polycarboxylic acid resin, a melamine resin, a glyoxal resin, a water-soluble urethane resin, ammonium zirconiumcarbonate, a polycarbodiimide or a polyglycidyl ether may be used.

Among these compounds, ammonium zirconiumcarbonate, a polycarbodiimide and a polyglycidyl ether are particularly preferable. Only a single kind of such a compound may be used or plural kinds of such compounds may be used.

The amount of the compound (S) is preferably in the range of 0.03 to 1.0 $g/m^2$ as mentioned above, more preferably in the range of 0.05 to 0.9 $g/m^2$ and still more preferably in the range of 0.1 to 0.8 $g/m^2$. When the amount to be provided is less than 0.03 $g/m^2$, degree of bonds other than hydrogen bonds between cellulose fibers is low. As a consequence, the wet strength of the recording sheet and suppression of the dimensional change of the recording sheet are likely to be insufficient and curl and cockle are likely to be heavy. When the amount exceeds 1.0 $g/m^2$, the degree of bonds between cellulose fibers of the sheet is likely to be too high and curl and cockle are likely to be heavy after all.

A second method for obtaining the recording sheet of the invention comprises providing the sheet with a heat-curable material and/or a thermoplastic material. The heat-curable material and/or the thermoplastic material is/are provided to the sheet in the similar way to that in the case of providing the surfactant R and/or the compound P to the sheet in the first method. By this method, formation of bonds between fibers is inhibited as described above.

The thermoplastic material is a material which, upon application of heat during drying process in manufacture of the recording sheet, plasticizes and adheres to a material constituting the sheet such as pulp fibers in the raw material so that the thermoplastic material serves as an adhesive between fibers and can provide adhesion between fibers which are not easily separated even in the presence of water. Also, the heat-curable material means a material which, upon application of heat during drying process in manufacture of the recording sheet, is cured to form bonds with a material constituting the sheet such as pulp fibers in the raw material wherein the bonds are not easily broken even in the presence of water. The heat-curable material may be a material which reacts with a reactive functional group containing a hydrogen atom such as a hydroxyl group to form a covalent bond which is not easily broken even in the presence of water or a material which polymerizes by itself to form a polymer whose shape is hard to change. The heat-curable material is more preferably a cross-linking agent (substance having two or more reactive groups capable of forming covalent bonds with other molecules) which can cross-link materials constituting the recording sheet with one another.

The heat-curable material is not particularly limited as long as it is cured by heat to cross-link and adhere fibers with each other. Heat curable materials having a curing temperature of 50 to 150° C. are preferable.

Examples of the heat-curable material include heat-curable resins such as formaldehyde resins, phenol resins, melamine resins and polycarbodiimide resins. Also, epoxy resins or ammonium zirconiumcarbonate which cross-link fibers may be used. Moreover, aqueous polyurethane resins which polymerize and cure may be used.

As the heat-curable material, materials having foaming properties are more preferable.

The thermoplastic material is not particularly limited as long as it is plasticized to adhere fibers with each other. Thermoplastic materials having a softening point of 50 to 150° C. are preferable.

Examples of the thermoplastic material include heat-curable resins such as polyester resins, polyethylenes, polypropylenes and polyvinyl acetate.

If a heat-curable material or a thermoplastic material is capable of adhering and cross-linking fibers with each other, the material may be used as the heat-curable material or the thermoplastic material in the invention. Therefore, the heat-curable material or the thermoplastic material of the invention is not limited to the examples above.

The method of providing the heat-curable material and/or thermoplastic material to the sheet is a particularly preferable method for satisfying the preferable ranges of the above Young's modulus $(N/mm^2)\times[\text{thickness (mm)}]^3$ and air permeability. In this case, the amount to be provided is preferably in the range of 0.5 to 5.0 $g/m^2$ and more preferably in the range of 1.0 to 3.0 $g/m^2$ as a dry weight per recording sheet.

If the content (amount to be provided) of the thermoplastic material/heat-curable material is 0.5 $g/m^2$ or less, the above Young's modulus $(N/mm^2)\times[\text{thickness (mm)}]^3$ is below 2.0 and suppression of curl and cockle is likely to be insufficient. On the other hand, if the Young's modulus exceeds 5.0 $g/m^2$, the air permeability exceeds 100s, so that the ink penetrability of the recording sheet is low and intercolor bleed is likely to be caused when the surface of the recording sheet is provided with inks having different colors adjacent to each other.

The raw material of the recording sheet of the invention includes cellulose pulp. The recording sheet is not particularly limited as long as the sheet includes 1) the surfactant R and/or the compound having one reactive group that reacts with an active hydrogen group of a carboxyl group or a hydroxyl group, or 2) the heat-curable material and/or the thermoplastic material. Such materials may be incorporated by being mixed with the raw material of the sheet or being coated on the base sheet (surface treatment). The surface of the sheet may be treated with other agents such as surface sizing agents.

The above base material, which uses at least cellulose pulp as its raw material, may be the following base sheet or plain sheet obtained by treating the surface of the base sheet with pigments or binders.

The aforementioned base sheet contains cellulose pulp. As the cellulose pulp, a known pulp may be used. Specifically, chemical pulp may be used and more specifically, pulps manufactured by chemical processing of woods such as hardwood bleached kraft pulp, hardwood unbleached kraft pulp, softwood bleached kraft pulp, softwood unbleached kraft pulp, hardwood bleached sulfite pulp, hard wood unbleached sulfite pulp, softwood bleached sulfite pulp, softwood unbleached sulfite pulp and pulps manufactured by chemically processing fiber raw materials such as cottons, hemp and bast may be used.xd Also, for example, ground wood pulp obtained by mechanically pulping woods or chips, chemi-mechanical pulp obtained by mechanically pulping woods or chips after impregnating these woods or chips with a chemical solution or thermo-mechanical pulp obtained by cooking chips until these chips are softened, followed by pulping by a refiner may be used. These pulps to be used may be made only of virgin pulps or waste sheet may be compounded in these pulps according to necessity.

Particularly, pulps only containing virgin pulps are preferably pulps which are bleached by a bleaching method (Elementally Chlorine Free; ECF) using not chlorine gas but chlorine dioxide or by a method (Total Chlorine Free; TCF) using no chlorine compound but ozone/hydrogen peroxide or the like.

Also, as raw materials of the above waste pulps, non-printed waste sheets such as high whites, special whites, middle whites and white brokes produced through trimming or cutting or produced as brokes in book-binding factories, printing factories and cutting factories; printed fine sheets such as printed or copied fine sheets and fine coated sheets; waste sheets written, for example, with ink or in a pencil; newspaper wastes including leaflets such as printed fine sheets, coated fine sheets, middle quality sheets and coated middle quality sheets; waste sheets such as middle quality sheets, coated middle quality sheets and woody sheets may be compounded.

As the waste pulp used in the invention, pulps obtained by processing the aforementioned waste sheet raw materials by at least one of ozone bleaching and hydrogen peroxide bleaching are desirable. Also, in order to obtain base sheets having a higher degree of whiteness, the ratio of the waste pulps obtained by the above bleaching treatment is preferably 50% by weight to 100% by weight. Further, the ratio of the waste pulps is more preferably 70% by weight to 100% by weight from the viewpoint of resource reutilization.

The above ozone treatment has the effect of decomposing fluorescent dyes which are usually contained in fine sheets and the hydrogen peroxide treatment has the effect of preventing yellowing caused by an alkali used in deinking treatment. It is known that the treatment which is a combination of the above two treatments not only makes it easy to carry out the deinking of waste sheets but also improves the whiteness of pulp. Also, the combined treatment has the effect of decomposing and removing residual chlorine compounds in pulp and therefore has a large effect on a reduction in the content of organic halogen compounds in waste sheets using pulp bleached with chlorine.

Also, it is preferable to add a filler to the base sheet used in the invention to regulate the opaqueness, whiteness and surface characteristics. In the case of intending to reduce the amount of halogens in particular, a filler containing no halogen is preferably used. Examples of the filler which may be used may include white inorganic pigments such as heavy calcium carbonate, light calcium carbonate, choke, kaolin, baked clay, talc, calcium sulfate, barium sulfate, titanium dioxide, zinc oxide, zinc sulfide, zinc carbide, aluminum silicate, calcium silicate, magnesium silicate, synthetic silica, aluminum hydroxide, alumina, sericite, white carbon, saponite, calcium montmorillonite, sodium montmorillonite and bentonite and organic pigments such as acryl type plastic pigments, polyethylene and urea resins. Also, when compounding waste sheets, the amount of these waste sheets must be adjusted by estimating the content of ash contained in the waste sheet raw materials in advance.

Moreover, it is preferable to add an internal sizing agent in the base sheet used in the invention. As the internal sizing agent, a neutral rosin type sizing agent, alkenyl succinic acid anhydride (ASA), alkyl ketene dimer (AKD) and petroleum resin type sizing agent which are used in neutral sheet-making may be used.

When the surface of the recording sheet is controlled to be cationic, for example, a hydrophilic cationic resin or the like is used as a cationic material to treat the surface. In this case, the degree of the sheet sizing before this cationic resin is applied is preferably 10 seconds or more and less than 60 seconds to suppress the penetration of the cationic resin into the inside.

The base sheet as mentioned above may be surface-treated with, for example, a surface sizing solution containing the surfactant R to obtain the recording sheet of the invention.

The above surface sizing solution is constituted primarily of a solvent such as water. The concentration of the surface sizing agent, nonionic surfactant R and the like contained in the surface sizing solution is preferably in the range of 1 to 10% by weight and more preferably in the range of 3 to 7% by weight.

The amount of the surface sizing solution to be provided is preferably in the range of 0.1 to 3.0 $g/m^2$ per one surface of the recording sheet and more preferably in the range of 1.0 to 2.0 $g/m^2$ per one surface of the recording sheet.

When the treatment amount (amount to be provided) exceeds 3.0 $g/m^2$, the absolute amount of the surface sizing agent is too large and there is a case where the effect of the surfactant R on suppression of curl is impaired and curl and cockle are heavy. When the amount is below 0.1 $g/m^2$, the absolute amount of the surface sizing agent is too small and pigments and the like which are to be added together with the surface sizing agent cannot be fixed to the surface of the base sheet; thus, there is a case where sheet powder occurs in a large amount, causing machine troubles when the recording sheet is transferred in a copying machine or the like.

As the surface sizing agent, specifically, among surface sizing agents, not only oxidized starch which is used as a surface sizing agent, but also acetylated starch and starch phosphate which have improved hydrophobically are preferably used. Also, polyvinyl alcohols are preferably used whose degree of saponification is extremely low and which have a lot of hydrophobic groups and have high hydrophobicity. Moreover, polyvinyl alcohols are preferably used whose degree of saponification is extremely high and which have high crystallinity and have high hydrophobicity. Also, polyvinyl alcohols having a low degree of polymerization may be used for the purpose of improving image quality in an ink-jet system. Moreover, a silanol-modified surface sizing agent which is improved in hydrophobic properties may be used. Only a single kind of surface sizing agent may be used or plural sizing agents may be used.

The surface treatment may be carried out by applying the surface sizing solution to the sheet by usual application means such as a sizing press, shim size, gate roll, roll coater, bar coater, air knife coater, rod blade coater or blade coater. The recording sheet is obtained through the subsequent drying step.

It is to be noted that the surfactant R and the like are provided to the sheet in the invention not only by the aforementioned treatment with the surface sizing agent and the surfactant R but also by mixing and internally adding a surfactant R and the like during, for example, sheet-making.

The basic weight of the recording sheet of the present invention is preferably in the range of 60 to 128 $g/m^2$, more preferably in the range of 60 to 100 $g/m^2$ and still more preferably in the range of 60 to 90 $g/m^2$, although no particular limitation is imposed on it. A higher basic weight is more advantageous for suppression of curl and cockle. However, if the basic weight exceeds 128 $g/m^2$, the stiffness of the sheet is excessively high and there is therefore a case where the sheet-running characteristics in a printer are deteriorated. On the other hand, if the basic weight is lower than 60 $g/m^2$, there is a case where it is difficult to suppress curl and cockle sufficiently. Such a low basic weight is undesirable also from the viewpoint of offset.

Also, when the sheet is made, it is preferable to adjust the fiber orientation ratio to a range of 1.0 to 1.55, preferably of 1.0 to 1.45 and more preferably of 1.0 to 1.35. When the fiber orientation ratio is within the range, the curl of the sheet (recording sheet) after printing by an ink-jet system can be suppressed. The above term "fiber orientation ratio" is the fiber orientation ratio measured by a ultrasonic propagation velocity method. The ratio is a value calculated by dividing the ultrasonic propagation velocity in the MD (direction of sheet-making progress) of the sheet by the ultrasonic propagation velocity in the CD (direction perpendicular to the direction of sheet-making progress) of the sheet and is represented by the following equation.

Fiber orientation ratio of base sheet by a ultrasonic propagation velocity method (*T/Y* ratio)=(Ultrasonic propagation velocity in the *MD*)/(Ultrasonic propagation velocity in the *CD*)

In this case, the fiber orientation ratio measured by this ultrasonic propagation velocity method is measured using a SONIC SHEET TESTER (trade name, manufactured by Nomura Shoji (K.K.)).

The surface of the recording sheet of the invention preferably includes a cationic polymer or a polyvalent metal salt. In this case, when ink-jet ink contains an anionic polymer, the anionic polymer are cross-linked through the cationic polymer or polyvalent metal salt. Colorants in the ink coagulate very rapidly owing to the cross-linking, and high quality print image can be obtained. Moreover, since penetration of an ink solvent into the inside of the sheet is inhibited, curl and cockle which occur immediately after printing and curl and cockle after air drying can be suppressed further efficiently.

As the aforementioned polyvalent metal salt, for example, chlorides, sulfates, nitrates, formates or acetates of potassium, barium, calcium, magnesium, zinc, tin, manganese, aluminum or other polyvalent metals may be used. Specific examples of the polyvalent metal salt include barium chloride, calcium chloride, calcium acetate, calcium nitrate, calcium formate, magnesium chloride, magnesium sulfate, magnesium nitrate, magnesium acetate, magnesium formate, zinc chloride, zinc sulfate, zinc nitrate, zinc formate, tin chloride, tin nitrate, manganese chloride, manganese sulfate, manganese nitrate, manganese formate, aluminum sulfate, aluminum nitrate, aluminum chloride and aluminum acetate. Only a single kind of polyvalent metal salt may be used or plural kinds of polyvalent metal salts may be used. Among these polyvalent metals salts, metal salts with high solubilities in water and high valence numbers are preferable. In addition, if the counter ion of the polyvalent metal salt is a strong acid, yellowing of the sheet occurs after coating. Therefore, calcium chloride, calcium formate, magnesium chloride, magnesium formate and the like are preferable as the polyvalent metal salts. Examples of the cationic polymer include cationic cellulose and cationic starch; however, substances other than these substances are also included in the scope of the invention.

The above-exemplified cationic polymer or polyvalent metal salt may be incorporated into the surface of the recording sheet by adding the polymer or metal salt to the aforementioned surface sizing solution or by applying another coating solution containing the polymer or metal salt to the surface of the sheet. In the latter case, the coating may be carried out by dissolving the polymer or metal salt in water to form a coating solution and applying the coating solution directly to the recording sheet (or a sheet). However, generally, a binder is also included in the coating solution.

The content of the cationic polymer and polyvalent metal salt contained in the surface of the recording sheet is preferably in the range of 0.1 to 2 $g/m^2$ and more preferably in the range of 0.5 to 1 $g/m^2$.

If the content is less than 0.1 $g/m^2$, the degree of the reaction with pigments and anionic polymers contained in ink is low and image quality is likely to be low, curl and cockle immediately after printing are likely to be heavy, and curl and cockle after air drying are likely to be also heavy. On the other hand, if the content exceeds 2 $g/m^2$, the penetration of ink is impaired and ink-drying properties are likely to be impaired in high-velocity printing.

The recording sheet of the present invention has a degree of CD shrink of preferably 0.55 or less and more preferably 0.50 or less. When the degree of CD shrink exceeds 0.55, curl and cockle tend to be heavy even if the aforementioned technologies of the invention are used.

The above term "degree of CD shrink" means the rate of the dimensional change of the recording sheet measured in the following way. In the explanation, "cycle E" is a moisture absorption and desorption cycle consisting of 65% RH for 1.5 hours, then 25% RH for 1.5 hours, then 65% RH for 1.5 hours, and then 90% RH for 1.5 hours. The recording sheet is allowed to stand under the following environment: temperature is always kept at 23° C.; the cycle E is repeated three times, then the humidity is changed to 65% RH and kept at the humidity for 1.5 hours, and then the humidity is changed to 25% RH and kept at the humidity for 1.5 hours. The rate of the dimensional change of the recording sheet during the last change of the humidity from 65% RH to 25% RH is measured. Namely, the degree of CD shrink means "a" in FIG. 1 showing the relationship between a change in relative humidity and the rate of the dimensional change. The dimension of the recording sheet was measured by a H•K type shrink tester manufactured by Oji Engineering Co., Ltd.

Here, the CD means a direction orthogonal to the flow direction of the recording sheet at manufacture thereof, as mentioned above. When the dimension of the recording sheet is measured, the dimension in the CD is measured.

Also, the recording sheet of the invention has a formation index of preferably 20 to 50 and more preferably 25 to 40. If the formation index is less than 20, the resultant formation unevenness causes the surfactant to exist unevenly and image transfer unevenness is therefore easily caused in an electrophotographic system. On the other hand, if the formation index exceeds 50, it is necessary to strengthen the beating of the paper to secure the uniformity of the paper and curl is likely to be heavy in an ink-jet recording system.

Here, the formation index is measured by using a 3D Sheet Analyzer (M/K950) manufactured by M/K Systems, Inc. (MKS Company) wherein the diameter of the diaphragm of the analyzer is set to 1.5 mm and a microformation tester (MFT) is used. Specifically, the sample is set to the rotating drum in the 3D Sheet Analyzer to measure a difference in local basic weight in the sample as a difference in the quantity of light by using a light source set on the axis of a drum and a photodetector which is placed outside of the drum and which corresponds to the light source. The measured range is controlled by the diameter of a diaphragm in the light incident part of the photodetector. Next, the difference (variation) in the quantity of light is amplified, subjected to A/D conversion and classified into 64 photo-measurable base weight ranks. 1,000,000 pieces of data are taken by one scanning to obtain a frequency histogram of the data. Then, the maximum frequency (peak value) of the histogram is divided by the number of the classes each having a frequency of 100 or more among classes corresponding to the 64 fine base weights and the obtained value is multiplied by 1/100 to calculate the formation index. A higher formation index indicates a better formation.

Also, when the recording sheet is used for image recording in an electrophotographic system, the electric characteristics of the sheet are important. In the invention, in particular, surfactants and cationic materials are used frequently, which might change the electric characteristics. Therefore, image transfer unevenness could arise in an electrophotographic system depending on the combination and content of these materials.

In the invention, the print side of the recording sheet preferably has a surface resistance of $1.0\times10^9$ to $1.0\times10^{11}$ $\Omega/cm^2$ and a volume resistivity of $1.0\times10^{10}$ to $1.0\times10^{12}$ $\Omega/cm$. When the surface resistance or the volume resistivity is out of the above range, image transfer unevenness is likely to arise in an electrophotographic system.

The surface resistivity is more preferably in the range of $5.0\times10^9$ to $7.0\times10^{10}$ $\Omega/cm^2$ and still more preferably in the range of $5.0\times10^9$ to $2.0\times10^{10}$ $\Omega/cm^2$. The surface resistivity shows the resistance of the surface to which, for example, the aforementioned polyvalent metal salt and/or cationic resin were applied. Also, the volume resistivity is more preferably in the range of $1.3\times10^{10}$ to $1.6\times10^{11}$ $\Omega/cm$ and still more preferably in the range of $1.3\times10^{10}$ to $4.3\times10^{10}$ $\Omega/cm$.

The aforementioned surface resistivity and volume resistivity are measured by a method according to JIS-K-6911 after the sample is stored under the condition of 23° C. and 50% RH for 24 hours. JIS-K-6911 is incorporated herein by reference.

<Image Recording Method>

Next, the image recording method of the invention will be explained.

Any image recording method may be used as the image recording method of the invention insofar as it uses the recording sheet of the invention upon recording with ink-jet ink (hereinafter abbreviated as "ink" if necessary) or an electrophotographic toner (hereinafter abbreviated as "toner" if necessary). However, the image recording method of the invention is preferably an ink-jet recording system, which uses ink, to obtain high quality documents.

(Image Recording Method in an ink-jet Recording System)

First, the image recording method of an ink-jet recording system (hereinafter referred to as "ink-jet recording method") according to the invention will be explained.

The ink-jet recording method of the invention is an image recording method according to an ink-jet recording system in which liquid droplets of ink are discharged onto a recording sheet to record an image on the surface of the recording sheet.

Any ink may be used without any particular limitation insofar as it is an ink containing at least a colorant. However, inks including a colorant, an anionic compound, a water-soluble organic solvent and water as essential components are preferable. The ink used in the invention may also include a pigment dispersant, a surfactant, and an additive. Each component will be hereinafter explained.

Colorant

Examples of the colorant used in the ink include water-soluble dyes, organic pigments and inorganic pigments.

Black inks are usually pigment-based black inks. Examples of the black pigment include carbon black pigments such as furnace black, lamp black, acetylene black and channel black. Specific examples of the carbon black pigment include RAVEN 7000, RAVEN 5750, RAVEN 5250, RAVEN 5000 ULTRA II, RAVEN 3500, RAVEN 2000, RAVEN 1500, RAVEN 1250, RAVEN 1200, RAVEN 1190 ULTRA II, RAVEN 1170, RAVEN 1255, RAVEN 1080 and RAVEN 1060 (the above compounds are manufactured by Columbian Chemicals Company), REGAL 400R, REGAL 330R, REGAL 660R, MOGUL L, Black Pearls L, MONARCH 700, MONARCH 800, MONARCH 880, MONARCH 900, MONARCH 1000, MONARCH 1100, MONARCH 1300 and MONARCH 1400 (the above compounds are manufactured by Cabot Corporation), Color Black FW1, Color Black FW2, Color Black FW2V, Color Black 18, Color Black FW200, Color Black S150, Color Black S160, Color Black S170, PRITEX 35, PRITEX U, PRITEX VRINTEX140U, PRINTEX140V, Special Black 6, Special Black 5, Special Back 4A and Special Black 4 (the above compounds are manufactured by Degussa Company) and No. 25, No. 33, No. 40, No. 47, No. 52, No. 900, No. 2300, MCF-88, MA600, MA7, MA8 and MA100 (the above compounds are manufactured by Mitsubishi Chemical Co., Ltd.).

Although it is difficult to describe a preferable structure of carbon black in general, carbon black preferably has an average primary particle diameter of 15 to 30 nm, a BET surface area of 70 to 300 $m^2/g$, a DBP oil absorption amount of 0.5 to $1.0\times10^{-3}$ L/g, a volatile component proportion of 0.5 to 10% by weight and an ash content of 0.01 to 1.00% by weight. If carbon black out of such ranges is used, the dispersion particle diameter in the ink is likely to be large.

Examples of usable colorants used in cyan, magenta or yellow ink include not only dyes but also hydrophilic pigments obtained by incorporating dispersants containing hydrophilic groups into hydrophobic pigments and self-dispersible pigments.

As the aforementioned water-soluble dye, known dyes or newly synthesized dyes may be used. Among water-soluble dyes, direct dyes or acid dyes with which vivid colors can be obtained are preferable. As the water-soluble dyes, specifically, C.I. Direct Blue-1, -2, -6, -8, -22, -34, -70, -71, -76, -78, -86, -142, -199, -200, -201, -202, -203, -207, -218, -236 and -287; C.I. Direct Red-1, -2, -4, -8, -9, -11, -13, -20, -28, -31, -33, -37, -39, -51, -59, -62, -63, -73, -75, -80, -81, -83, -87, -90, -94, -95, -99, -101, -110 and -189; C.I. Direct Yellow-1, -2, -4, -8, -11, -12, -26, -27, -28, -33, -34, -41, -44, -48, -86, -87, -88, -135, -142 and -144; C.I. Acid Blue-1, -7, -9, -15, -22, -23, -27, -29, -40, -43, -55, -59, -62, -78, -80, -81, -90, -102, -104, -111, -185 and -254; Acid Red-1, -4, -8, -13, -14, -15, -18, -21, -26, -35, -37, -249 and -257, C.I. Acid Yellow-1, -3, -4, -7, -11, -12, -13, -14, -19, -23, -25, -34, -38, -41, -42, -44, -53, -55, -61, -71, -76 and -79 or the like may be used. Only a single kind of water-soluble dye may be used or plural kinds of water-soluble dyes may be used.

Examples of the cationic dyes include C.I. Basic Yellow-1, -11, -13, -19, -25, -33 and -36; C.I. Basic Red-1, -2, -9, -12, -13, -38, -39 and -92; and C.I. Basic Blue-1, -3, -5, -9, -19, -24, -25, -26 and -28.

Specific Examples of the cyan color pigment include C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

Specific examples of the magenta color pigment include C.I. Pigment Red-5, C.I. Pigment Red-7, C.I. Pigment Red-12, C.I. Pigment Red-48, C.I. Pigment Red-48:1, C.I. Pigment Red-57, C.I. Pigment Red-12, C.I. Pigment Red-122, C.I. Pigment Red-123, C.I. Pigment Red-146, C.I. Pigment Red-168, C.I. Pigment Red-184 and C.I. Pigment Red-202.

Specific Examples of the yellow color pigments include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow-128, C.I. Pigment Yellow-129, C.I. Pigment Yellow-151 and C.I. Pigment Yellow-154.

The pigments which may be used in the invention may be pigments (self-dispersible pigments) self-dispersible in water. The self-dispersible pigments are pigments which have a large number of solubility-imparting groups imparting solubility in water and which are stably dispersed even in the absence of pigment dispersants. Specifically, usual pigments may be subjected to surface modification such as acid/base treatment, coupling agent treatment, polymer graft treatment, plasma treatment or oxidizing/reducing treatment to obtain self-dispersible pigments. In addition to these pigments with such surface modifications, CAB-O-JET-200, CAB-O-JET -300, IJX-55, IJX-253, IJX266 and IJX-273 manufactured by Cabot Corporation, Nicrojet Black CW-1 manufactured by Orient Chemical Industries, Ltd. and the pigments commercially available from Nippon Shokubai Co., Ltd. and the like may be used as the self-dispersible pigments.

The solubility-imparting group existing on the surface of the self-dispersible pigment may be nonionic, cationic, or anionic and is preferably sulfonic acid, carboxylic acid, a hydroxyl group and phosphoric acid. In the case of sulfonic acid, carboxylic acid or phosphoric acid, these acids may be used as it is in a free acid state. However, it is preferable to use these acids in a state of salts obtained by combination with basic compounds.

In this case, as the basic compound, alkali metals such as sodium, potassium and lithium, aliphatic amines such as monomethylamine, dimethylamine and triethylamine, alcohol amines such as monomethanolamine, monoethanolamine, diethanolamine, triethanolamine and diisopropanolamine and ammonia may be used. Among these compounds, basic compounds of alkali metals such as sodium, potassium and lithium are particularly preferable since the basic compounds are strong electrolytes and greatly facilitate dissociation of an acid group.

When a pigment is contained as a colorant in the ink, the content of the pigment is preferably in the range of 0.5 to 20% by weight and particularly preferably in the range of 2 to 10% by weight. When the content of the pigment is less than 0.5% by weight, optical density is likely to be insufficient. On the other hand, when the content of the pigment exceeds 20% by weight, image fixability is likely to be impaired.

When a dye is contained as a colorant in the ink, the content of the dye is preferably in the range of 0.1 to 10% by weight, more preferably in the range of 0.5 to 8% by weight and still more preferably 0.8 to 6% by weight. When the dye is contained in an amount exceeding 10% by weight, clogging at the tip of a print head occurs easily, whereas when the content of the dye is less than 0.1% by weight, image density is likely to be insufficient.

Anionic Compound

Examples of the aforementioned anionic compound used in the ink include acids such as carboxylic acids and sulfonic acids, derivatives thereof, anionic water-soluble polymers and anionic polymer emulsions. The anionic pigment dispersants described below can also be used.

Specific examples of the carboxylic acids include carboxylic acids such as formic acid, acetic acid, propionic acid, butyric acid, valeric acid, lactic acid, tartaric acid, benzoic acid, acrylic acid, crotonic acid, butenoic acid, methacrylic acid, tiglic acid, allylic acid, 2-ethyl-2-butenoic acid, oxalic acid, malonic acid, succinic acid, glutaric acid, maleic acid, fumaric acid, methylmaleic acid and glyceric acid, polymers thereof, and derivatives thereof. Alkali metal salts, alkali earth metal salts and ammonium salts of these compounds may also be used.

Specific examples of the sulfonic acids include sulfonic acids such as benzenesulfonic acid, toluenesulfonic acid, xylenesulfonic acid, benzenedisulfonic acid, benzenetrisulfonic acid, hydroxybenzenesulfonic acid, chlorobenzenesulfonic acid, bromobenzenesulfonic acid, 4-hydroxy-1,3-benzenedisulfonic acid, sodium 4,5-dihydroxybenzene-1,3-disulfonate and o-aminobenzenesulfonic acid, derivatives thereof, alkali metal salts thereof, alkali earth metal salts thereof, and ammonium salts thereof.

Also, these compounds are preferably used in a state of salts with basic compounds to improve solubility in water. As the compound which is capable of forming salts with the anionic compound, alkali metals such as sodium, potassium and lithium, aliphatic amines such as monomethylamine, dimethylamine and triethylamine, alcohol amines such as monomethanolamine, monoethanolamine, diethanolamine triethanolamine and diisopropanolamine and ammonia may be used.

More preferable examples of the anionic water-soluble polymer include alkylacrylate/acrylic acid copolymers, styrene/alkylmethacrylate/methacrylic acid copolymers, styrene/maleic acid copolymers, styrene/methacrylic acid copolymers, styrene/acrylic acid copolymers, alkylmethacrylate/methacrylic acid copolymers, styrene/alkylacrylate/acrylic acid copolymers, styrene/phenylmethacrylate/methacrylic acid copolymers and styrene/cyclohexylmethacrylate/methacrylic acid copolymers, salts therof, and derivatives thereof.

The anionic water-soluble polymer contained in the ink preferably has a structure comprising a hydrophilic part and a hydrophobic part. The anionic water-soluble polymer preferably includes a carboxylic acid or a salt of carboxylic acid as a functional group in the hydrophilic part.

Specifically, the monomers constituting the hydrophilic part preferably comprise an acrylic acid, a methacrylic acid, or maleic acid (anhydride). The monomer molecules may include only a single kind of monomer or plural kinds of monomers.

On the other hand, examples of the monomers constituting the hydrophobic part include styrene derivatives such as styrene, α-methylstyrene and vinyltoluene, vinylcyclohexane, vinylnaphthalene, vinylnaphthalene derivatives, alkylacrylates, alkylmethacrylates, phenylmethacrylate, cycloalkylmethacrylates, alkyl crotonates, dialkyl itaconates and dialkyl maleates. The monomers preferably comprise styrene, an alkylacrylate, an arylacrylate or an alkyl(meth)

acrylate. The monomer molecules may include only a single kind of monomer or plural kinds of monomers.

Only a single kind of anionic water-soluble polymer may be used or plural kinds of anionic water-soluble polymers may be used. The content of the anionic water-soluble polymer in the ink may be in the range of 0.1 to 10% by weight and preferably in the range of 0.3 to 5% by weight. When the content is less than 0.1% by weight, long-term preserving stability is likely to be deteriorated and the optical density of the image is likely to be low. When the content exceeds 10% by weight, the ink might be unable to be discharged normally and the optical density of the image is likely to be low.

Water-soluble Organic Solvent

Examples of the water-soluble organic solvent used in the ink include polyhydric alcohols such as ethylene glycol, diethylene glycol, propylene glycol, butylene glycol, triethylene glycol, 1,5-pentanediol, 1,2,6-hexanetriol and glycerin, polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether and dipropylene glycol monobutyl ether, nitrogen-containing solvents such as pyrrolidone, N-methyl-2-pyrrolidone, cyclohexyl pyrrolidone and triethanolamine, alcohols such as ethanol, isopropyl alcohol, butyl alcohol and benzyl alcohol, sulfur-containing solvents such as thiodiethanol, thiodiglycerol, sulfolane and dimethyl sulfoxide, propylene carbonate and ethylene carbonate. Only a single kind of water-soluble organic solvent may be used or plural kinds of water-soluble organic solvents may be used.

The content of the water-soluble organic solvent contained in the ink is preferably in the range of 1 to 60% by weight and particularly preferably in the range of 5 to 40% by weight. When the content of the water-soluble organic solvent is less than 1% by weight, long-term preserving stability is likely to be deteriorated. On the other hand, when the content exceeds 60% by weight, discharge stability is likely to be deteriorated and the ink might be unable to be discharged normally.

Water

As the water used in the ink, ion exchange water, distilled water, pure water, ultra-pure water and the like may be used.

The content of water in the ink is preferably in the range of 15 to 98% by weight and particularly preferably in the range of 45 to 90% by weight. When the content of water is less than 15% by weight, discharge stability is likely to be deteriorated and the ink might be unable to be discharged normally. On the other hand, when the content exceeds 98% by weight, long-term preserving stability is likely to be deteriorated.

Other Components

A pigment dispersant may be used to disperse pigments contained in the ink. Specific examples of the pigment dispersant include polymer dispersants, anionic surfactants, cationic surfactants, amphoteric surfactants and nonionic surfactants.

Among these pigment dispersants, pigment dispersants which form organic anions when ionized in water are called an anionic pigment dispersant in the invention. As this anionic pigment dispersant, the foregoing anionic water-soluble polymers may be used.

As the polymer dispersant, any polymer may be used effectively insofar as the polymer has a hydrophilic structural part and a hydrophobic structural part. Examples of the polymer having a hydrophilic structural part and a hydrophobic structural part include condensation-type polymers and addition polymers.

Examples of the condensation-type polymer include known polyester-type dispersants. Examples of the addition polymer include addition polymers of monomers having α,β-ethylenic unsaturated groups. Monomers containing α,β-ethylenic unsaturated groups having hydrophilic groups may be combined properly and copolymerized with monomers containing α,β-ethylenic unsaturated groups having hydrophobic groups to thereby obtain an intended polymer dispersant. A homopolymer of a monomer having an α,β-ethylenic unsaturated group having a hydrophilic group may also be used.

Examples of the monomer containing an α,β-ethylenic unsaturated group having a hydrophilic group include monomers having carboxyl groups, sulfonic acid groups, hydroxyl groups, phosphoric acid groups or the like. Specific examples of the monomer include acrylic acid, methacrylic acid, crotonic acid, itaconic acid, monoester of itaconic acid, maleic acid, monoester of maleic acid, fumaric acid, monoester of fumaric acid, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate and diethylene glycol dimethacrylate.

Examples of the monomer containing an α,β-ethylenic unsaturated group having a hydrophobic group include styrene derivatives such as styrene, α-methylstyrene and vinyltoluene, vinylcyclohexane, vinylnaphthalene, vinylnaphthalene derivatives, alkylacrylate, phenylacrylate, alkylmethacrylate, phenylmethacrylate, cycloalkylmethacrylate, alkyl crotonate, dialkyl itaconate and dialkyl maleate.

Preferable examples of the copolymers of these monomers include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkylacrylate/acrylic acid copolymers, alkylmethacrylate/methacrylic acid copolymers, styrene/alkylmethacrylate/methacrylic acid copolymers, styrene/alkylacrylate/acrylic acid copolymers, styrene/phenylmethacrylate/methacrylic acid copolymers and styrene/cyclohexylmethacrylate/methacrylic acid copolymers.

Also, copolymers obtained by copolymerizing monomers having polyoxyethylene groups or hydroxyl groups and the monomers of each of the above polymers may also be used. Moreover, in order to heighten affinity to a pigment having an acidic functional group on the surface thereof and to improve dispersion stability, monomers having cationic functional groups may be incorporated into the above polymers. Examples of the monomers having cationic functional groups include N,N-dimethylaminoethylmethacrylate, N,N-dimethylaminoethylacrylate, N,N-dimethylaminomethacrylamide, N,N-dimethylaminoacrylamide, N-vinylpyrrole, N-vinylpyridine, N-vinylpyrrolidone and N-vinylimidazole.

These copolymers each may be a random copolymer, a block copolymer, or a graft copolymer. Also, for example, a polystyrenesulfonic acid, a polyacrylic acid, a polymethacrylic acid, a polyvinylsulfonic acid, a polyalginic acid, a polyoxyethylene/polyoxypropylene/polyoxyethylene block copolymer, a formalin condensate of naphthalenesulfonic acid, a polyvinylpyrrolidone, a polyethyleneimine, a polyamines, a polyamides, a polyvinylimidazoline, an aminoalkylacrylateDacrylamide copolymer, chitosan, a polyoxyethylene fatty acid amide, a polyvinyl alcohol, a polyacrylamide, a cellulose derivative such as carboxymethyl cellulose or carboxyethyl cellulose, a polysaccharide or a derivative thereof may also be used.

The hydrophilic group of the pigment dispersant is preferably a carboxylic acid or a salt of a carboxylic acid although no particular limitation is imposed on it.

As to the neutralization amount of the above pigment dispersion, 50% or more and particularly 80% or more of the acid value of the copolymer is preferably neutralized. The molecular weight of the pigment dispersant is preferably 2000 to 15000 and particularly 3500 to 10000 as a weight average molecular weight (Mw). The structures and proportions of the hydrophilic part and hydrophobic part may be selected in accordance with the combination of the pigment and the solvent.

Only a single kind of pigment dispersant may be used or plural kinds of pigment dispersants may be used. The amount of the pigment dispersant to be added is generally in the range of 0.1 to 100% by weight, preferably in the range of 1 to 70% by weight and more preferably in the range of 3 to 50% by weight although the suitable amount range differs depending on the type of the pigment.

The ink may include a surfactant. The surfactant is added in order to control the surface tension and wettability of the ink and the pigment dispersant of the pigment ink or to solubilize organic impurities, thereby improving reliability at discharge of the ink from nozzles.

As the type of surfactant, nonionic or anionic surfactants which scarcely exert an influence on the dispersion state of a water-insoluble colorant and on the dissolution state of a water-soluble dye are preferable. As the nonionic surfactant, for example, polyoxyethylene nonylphenyl ether, polyoxyethylene octylphenyl ether, polyoxyethylene dodecylphenyl ether, a polyoxyethylene alkyl ether, a polyoxyethylene fatty acid ester, a sorbitan fatty acid ester, a polyoxyethylene sorbitan fatty acid ester, a fatty acid alkylolamide, an acetylenealcohol ethyleneoxide adduct, a polyethyleneglycol polypropyleneglycol block copolymer, a polyoxyethylene ether of a glycerin ester or a polyoxyethylene ether of a sorbitol ester may be used. As the anionic surfactant, for example, an alkylbenzene sulfonate, an alkylphenylsulfonate, an alkylnaphthalenesulfonate, a higher fatty acid salt, a sulfate or sulfonate of a higher fatty acid ester or a higher alkyl sulfosuccinate may be used.

Also, as the amphoteric surfactant, betaine, sulfobetaine, sulfate betaine, imidazoline or the like may be used. Further, a silicone type surfactant such as a polysiloxane polyoxyethylene adduct, a fluorine type surfactant such as oxyethylene perfluoroalkyl ether or a bio-surfactant such as spiculisporic acid, rhamnolipid and lysolecithin may also be used. Only a single kind of surfactant may be used in the ink or plural kinds of surfactants may be used in the ink. The amount to be added may be adjusted according to intended characteristics, such as surface tension.

Moreover, the ink may include other additives such as a pH buffer, an antioxidant, a mildew-proofing agent, a viscosity regulator, a conducting agent, an ultraviolet absorber, a chelating agent, a water-soluble dye, a dispersion dye and an oil-soluble dye. The content of these additives in the ink is preferably 20% by weight or lower.

The ink as explained above may be obtained by adding a predetermined amount of a colorant to an aqueous solution, stirring the solution sufficiently, dispersing components in the solution by using a dispersing machine, removing coarse particles by centrifugation or the like, then adding predetermined solvents and additives, followed by stirring and mixing and then filtering.

As the dispersing machine, a commercially available dispersing machine may be used. Examples of the dispersing machine include a colloid mill, flow jet mill, slasher mill, high-speed disperser, ball mill, attriter, sand mill, sand grinder, ultrafine mill, Eiger motor mill, DYNO-mill, pearl mill, agitator mill, cobol mill, three-roll, two-roll, extruder, kneeder, microfluidizer, laboratory homogenizer and ultrasonic homogenizer. Only a single machine may be used for the dispersion or two or more machines may be used for the dispersion. It is preferable to employ a dispersing method which uses no dispersion medium when contamination with inorganic impurities has to be prevented. In this case, it is preferable to use a microfluidizer or a ultrasonic homogenizer.

The ink including the aforementioned self-dispersion type pigment may be obtained by subjecting the pigment to a surface modification, adding the resultant pigment in water, thoroughly stirring the mixture, then dispersing the mixture by using a dispersing machine which may be selected from the above dispersing machines according to necessity, removing coarse particles by employing, for example, centrifugation and adding predetermined solvents and additives, followed by stirring, mixing and filtration.

The pH of the ink is preferably in the range of 3 to 11 and particularly preferably in the range of 4.5 to 9.5. In the case of the ink having anionic free groups on the surface of the pigment, the pH of the ink is preferably in the range of 6 to 11, more preferably in the range of 6 to 9.5 and further preferably in the range of 7.5 to 9.0. In the case of the ink having cationic free groups on the surface of the pigment, the pH of the ink is preferably in the range of 4.5 to 8.0 and more preferably in the range of 4.5 to 7.0.

The viscosity of the ink is preferably in the range of 1.5 to 5.0 mPa·s and more preferably in the range of 1.5 to 4.0 mPa·s. When the viscosity of the ink exceeds 5.0 mPa·s, the penetration of the ink into the recording sheet is slow and mixed color bleeding is likely to occur. On the other hand, when the viscosity of the ink is less than 1.5 mPa·s, the penetration of the ink into the recording sheet is too fast, so that the ink pigments and anionic compound cannot be coagulated. In that case, the ink penetrates into the inside of the recording sheet, thus image density is likely to be low and blurring of characters is likely to occur.

The surface tension of the ink can be regulated, mainly by the amount of the aforementioned surfactant to be added and is preferably adjusted within a range of 25 to 37 mN/m. When the surface tension is below 25 mN/m, the penetration of the ink into the recording sheet is too fast, so that the ink colorant and anionic compound cannot be coagulated. In that case, the ink penetrates into the inside of the recording sheet, and image density is likely to be low and blurring of characters is likely to occur. On the other hand, when the surface tension of the ink is larger than 37 mN/m, the penetration of the ink into the recording sheet is slow and drying characteristics of the ink are likely to be impaired.

When the ink is used for printing on the recording sheet of the invention in an inkjet system, the amount of the ink per droplet to be discharged from a nozzle is preferably in the range of 1 to 20 pl and more preferably in the range of 3 to 18 pl.

A so-called thermal ink-jet system is a system in which thermal energy is used for forming liquid droplets. When a thermal ink-jet system is employed and the amount of the ink per droplet to be discharged is in the range of 1 to 20 pl, preferably 3 to 18 pl as mentioned above, the dispersion particle diameter of the pigment in the ink is preferably 20 to 120 nm in terms of volume average particle diameter and the number of coarse particles having sizes of 500 nm or larger is $5\times10^5$ or less per 2 μl of the ink. If the volume average particle diameter is smaller than 20 nm, image density is likely to be insufficient. On the other hand, if the volume average particle diameter is larger than 120 nm, clogging easily occurs in a print head and stable discharge characteristics cannot be secured in some cases. Moreover, if the number of coarse particles having particle sizes of 500 nm or larger exceeds $5\times10^5$ per 2 μl of the ink, clogging is likewise easily occur in a print head and the ink cannot be discharged stably in some cases. The number of coarse particles is more preferably $3\times10^5$ per 2 μl of the ink or less and more preferably $2\times10^5$ per 2 μl of the ink or less.

The storage elastic modulus of the ink at 24° C. is particularly preferably in the range of $5\times10^{-4}$ to $1\times10^{-2}$ Pa; within this range, the behavior of the ink on the surface of the recording sheet is satisfactory. It is to be noted that the above storage elastic modulus is a value measured in a low shearing speed range where the angular velocity is in the range of 1 to 10 rad/s. This value can be measured with ease by using a device capable of measuring viscoelasticity in a low shearing speed range. Examples of the measuring device include a VE type Viscoelasticity Analyzer (manufactured by VILASTIC SCIENTIFIC INC.) and DCR super low viscosity Viscoelasticity Measuring Device (manufactured by Paar Physica).

The ink-jet recording method of the invention ensures good printing quality when applied to any recording modes used in known ink-jet devices. The ink-jet recording method of the invention may be applied to a system having a means for heating a recording sheet during printing, before printing, or after printing, the means being capable of promoting the absorption and fixing of ink by heating the recording sheet and ink to 50° C. to 200° C.

Next, an example of an ink-jet recording device is described which is suitable for practicing the ink-jet recording method of the invention. This example is called a multi-pass system, in which the recording head is allowed to scan the surface of a recording sheet several times to form an image.

As a system which discharges ink from a nozzle, a so-called thermal ink-jet system is exemplified in which power is supplied to a heater disposed in a nozzle to foam ink in the nozzle so that the ink is discharged by the pressure generated by the foam. There is also a system in which power is supplied to a piezoelectric element to deform the piezoelectric element physically so that the force generated by the deformation is used for discharging ink from a nozzle. This system typically uses a piezo element as the piezoelectric element. In an ink-jet recording device used in the ink-jet recording method of the invention, the system for discharging ink from a nozzle may be any of the aforementioned systems and is not limited to these systems. The system is not limited throughout the specification.

The nozzles are arranged in a direction at almost a right angle to the direction of the major scanning direction of a head carriage. Specifically, these nozzles may be arranged in line at a density of 800 pieces/1 inch, although the number and density of these nozzles are not particularly limited. Also, these nozzles may be arranged not only in line but also in zigzags.

Ink tanks respectively containing a cyan ink, a magenta ink, a yellow ink and a black ink to be used in the invention are attached to respective recording heads on the upper part of the recording head. The inks in the ink tanks are supplied to the recording heads corresponding to respective colors. The ink tank and the head may be integrated with each other. The system for supplying ink is not limited to this system but may be a system in which the ink tanks are disposed separately from the recording head and supply the inks to the recording heads through ink supply tubes.

A signal cable is connected to each recording head. This signal cable communicates each piece of image information of cyan, magenta, yellow or black color which has been treated in an image processing section to each recording head.

The above recording head is secured to a head carriage. This head carriage is attached to a guide rod and a carriage guide in such a manner that it can be slid in a major scanning direction along the guide rod and the carriage guide. Then, a drive motor is rotated at predetermined timing whereby the head carriage can be driven reciprocally along the major scanning direction.

A platen is secured to the lower part of the head carriage and the recording sheet used in the invention is transferred to the surface of the platen by a sheet feed carriage roller at a predetermined timing. This platen can be constituted of a molding material such as a plastic.

An image can be printed on the recording sheet of the invention by using the ink as mentioned above in this manner. In the above example using a multi-pass system, an example provided with five heads including a head for the processing solution is explained. However, the range in which the ink-jet recording method in the invention can be applied to the multi-pass system is not limited to this example. The recording system may be a type which is provided with a total of two heads of a black head and a color head whose nozzles are divided into sections along the arrangement line of the nozzles, a predetermined color being allotted to each section.

The printing head scanning speed means the transfer speed of the recording head when the recording head scans the surface of the recording sheet plural times during printing in the so-called multi-pass system. In the multi-pass system, the printing head runs perpendicularly to the direction of the recording sheet transfer.

When performing high-speed printing at a printing speed of 10 ppm (10 sheets/minute) or higher which is equal to that of a laser printer in office, the scanning speed of the printing head must be 25 cm/sec or higher. However, in the high-speed printing, the interval between discharges of two inks having different colors is shortened, leading to easy occurrence of intercolor bleed (ICB). In the high-speed printing, since inks having a low surface tensions have to be used, feathering and reduction in image density are caused. Inks having such low surface tensions have high penetrability into a sheet and therefore printed characters and images can be easily seen from the backside, impairing duplex printability.

Next, a second example of the ink-jet recording device suitable for practicing the ink-jet recording method of the invention will be explained. This example is called a one-pass system. In the one-pass system, a recording head having almost the same width as a recording sheet and printing is finished when the recording sheet passes a part below the head. Because this one-pass system has higher productivity than the multi-pass system at the same scanning speed, the one-pass system enables higher speed printing than a laser recording system.

Since in the one-pass system, it is unnecessary for the recording head to scan the sheet plural times, the one-pass system enables high-speed printing with ease even if a recording sheet is transferred at a transfer speed (speed at which the recording sheet passes below the recording head) of 60 mm/sec or higher, which is equivalent to 10 ppm or higher. On the other hand, because split printing is impossible in this recording system, it is necessary to discharge a lot of ink at a time. Consequently, curl and cockle immediately after printing and curl and cockle after air drying are caused in conventional ink-jet recording methods using sheets other than the recording sheet of the invention.

On the other hand, in the ink-jet recording method in the invention, curl and cockle of the above recording sheet can be suppressed by using the aforementioned recording sheet of the invention even in the case of carrying out high-speed printing in the multi-pass system in which the printing head scanning speed is 250 mm/sec or higher or in the case of carrying out high-speed printing in the above one-pass system in which the recording sheet transfer speed is 60 mm/sec or more in the condition that the print head is fixed.

The scanning speed of the aforementioned printing head is preferably 500 mm/sec or higher and more preferably 1000 mm/sec or higher from the viewpoint of obtaining productivity almost equal to that of a laser printer. Also, the transfer speed of the recording sheet is preferably 100 mm/sec or higher and more preferably 210 mm/sec or higher.

Furthermore, in the ink-jet recording method of the invention, the amount of ink to be provided is preferably in the range of 6 to 30 $ml/m^2$.

The amount of ink to be provided means the amount of ink per unit area which is discharged by one scanning in the case of forming a solid image by using one or more inks.

In any one of the aforementioned systems, in order to provide a recording with inks enough to form a solid image by a small number of scans, the amount of ink to be discharged has to be as much as 6 $ml/m^2$ or more. Even in the case of high-speed printing which needs a large amount of ink to be discharged, curl and cockle of a recording sheet after printing can be suppressed if the ink-jet recording method of the invention is used.

The amount of ink to be discharged is preferably 7 to 20 $ml/m^2$, more preferably 7.5 to 10 $ml/m^2$ and particularly preferably less than 10 $ml/m^2$.

(Electrophotographic Image Recording Method)

The electrophotographic image recording method in the invention comprises: charging the surface of an electrostatic latent image holding member; exposing the surface of the electrostatic latent image holding member to form an electrostatic latent image; developing the electrostatic latent image on the surface of the electrostatic latent image holding member by using a developer to form a toner image; transferring the toner image to the surface of a recording sheet; and fixing the toner image on the surface of the recording sheet, wherein the recording sheet is the aforementioned recording sheet of the invention.

The electrophotographic image recording method of the invention ensures high quality of image similarly to conventional methods and in addition, curl which occurs immediately after printing can be suppressed.

Any device may be used as the image forming device used in the electrophotographic image recording method of the invention insofar as it utilizes an electrophotographic system involving the above charging step, exposure step, developing step, transfer step and fixing step. In the case of using, for example, four color toners including a cyan, a magenta, a yellow and a black toner, the device may be a color image forming device using a 4-cycle developing system in which developing agents each including a toner of a different color are provided sequentially to a light-sensitive body to form a toner image, a color image forming device (so-called tandem machine) provided with four developing units corresponding to respective colors, or the like.

As the toner for forming image, any known toners may be used without any particular limitation. However, for example, spherical toners having a small particle diameter and narrow particle size distribution may be used so as to obtain a highly precise image and toners containing a binder resin with a low melting point may be used in order to enable low-temperature fixation.

EXAMPLES

The present invention will be explained in more detail by way of examples, which are not intended to limit the invention. First, inks and recording sheets used in examples and comparative examples will be explained and then, the results of various evaluations on printing with combinations of these inks and recording sheets.

(1) Preparation of Ink

As the ink, a dye-type ink set 1 and a pigment-type ink set 2 are prepared. The following properties of the inks are measured in the following conditions. The surface tension is measured in an environment of 23° C. and 55% RH by using a Wilhelmy-type surface tension meter. The ink to be measured is placed in a measuring container, which is then fitted to a NEOMAT 115 (trade name, manufactured by Contraves) to measure the viscosity of the ink in the following condition: measuring temperature: 23° C. and shear rate: 1400 $s^{-1}$.

<Ink Set 1 (Color Dye Ink)>

Magenta Ink

Direct Red 227 (aqueous 10% by weight solution): 20 parts by weight

Ethylene glycol: 25 parts by weight

Urea: 5 parts by weight

Surfactant (trade name: SURFINOL 465, manufactured by Nisshin Chemicals Co., Ltd.): 2 parts by weight Deionized water is added to the above composition so as to increase the total amount to 100 parts by weight and the mixture is stirred for 30 minutes. Thereafter, the mixture is made to pass through a membrane filter having a pore size of 1 μm. The surface tension and viscosity of this ink are 31 mN/m and 2.0 mPa·s respectively.

Cyan Ink

Direct Blue 142 (aqueous 10% by weight solution): 20 parts by weight

Ethylene glycol: 25 parts by weight

Urea: 5 parts by weight

Surfactant (trade name: SURFINOL 465, manufactured by Nisshin Chemicals Co., Ltd.): 2 parts by weight Deionized water is added to the above composition so as to increase the total amount to 100 parts by weight and the mixture is stirred for 30 minutes. Thereafter, the mixture is made to pass through a membrane filter having a pore size of 1 μm. The surface tension and viscosity of this ink are 31 mN/m and 2.0 mPa·s respectively.

Yellow Ink

Direct Yellow 144 (aqueous 10% by weight solution): 20 parts by weight

Ethylene glycol: 25 parts by weight

Urea: 5 parts by weight

Surfactant (trade name: SURFINOL 465, manufactured by Nisshin Chemicals Co., Ltd.): 2 parts by weight Deionized water is added to the above composition so as to increase the total amount to 100 parts by weight and the mixture is stirred for 30 minutes. Thereafter, the mixture is made to pass through a membrane filter having a pore size of 1 μm. The surface tension and viscosity of this ink are 31 mN/m and 2.0 mPa·s respectively.

<Ink set 2 (Pigment Ink)>

Black Ink

Surface-treated pigment (trade name: CAB-O-JET-300, manufactured by Cabot): 4 parts by weight Styrene/maleic acid/sodium maleate copolymer: 0.5 parts by weight Diethylene glycol: 20 parts by weight Surfactant (trade name: SURFINOL 465, manufactured by Nisshin Chemicals Co., Ltd.): 0.5 parts by weight Urea: 5 parts by weight Ion exchange water: 70 parts by weight The above composition is stirred for 30 minutes. Then, the mixture is made to pass through a membrane filter having a pore size of 1 μm. The surface tension and viscosity of this ink are 32 mN/m and 2.8 mPa·s respectively.

Cyan Ink

Surface-treated pigment (trade name: IJX-253, manufactured by Cabot): 4 parts by weight Styrene/maleic acid/sodium maleate copolymer: 0.5 parts by weight Diethylene glycol: 20 parts by weight Surfactant (trade name: SURFINOL 465, manufactured by Nisshin Chemicals Co., Ltd.): 0.5 parts by weight Urea: 5 parts by weight Ion exchange water: 70 parts by weight The above composition is stirred for 30 minutes. Then, the mixture is made to pass through a membrane filter having an aperture of 1 μm. The surface tension and viscosity of this ink are 32 mN/m and 2.5 mPa·s respectively.

Magenta Ink

Surface-treated pigment (trade name: IJX-266, manufactured by Cabot): 4 parts by weight Styrene/maleic acid/sodium maleate copolymer: 0.5 parts by weight Diethylene glycol: 20 parts by weight Surfactant (trade name: SURFINOL 465, manufactured by Nisshin Chemicals Co., Ltd.): 0.5 parts by weight Urea: 5 parts by weight Ion exchange water: 70 parts by weight The above composition is stirred for 30 minutes. Then, the mixture is made to pass through a membrane filter having an aperture of 1 μm. The surface tension and viscosity of this ink are 33 mN/m and 2.7 mPa·s respectively.

Yellow Ink

Surface-treated pigment (trade name: IJX-273, manufactured by Cabot): 4 parts by weight Styrene/maleic acid/sodium maleate copolymer: 0.5 parts by weight Diethylene glycol: 20 parts by weight p1 Surfactant (trade name: SURFINOL 465, manufactured by Nisshin Chemicals Co., Ltd.): 0.5 parts by weight Urea: 5 parts by weight Ion exchange water: 70 parts by weight The above composition is stirred for 30 minutes. Then, the mixture is made to pass through a membrane filter having a pore size of 1 μm. The surface tension and viscosity of this ink are 33 mN/m and 2.7 mPa·s respectively.

(2) Production of Recording Sheet

The following recording sheets (1) to (24) are produced.

<Recording Sheet (1)>

Dry pulp made of hardwood kraft pulp which has been beaten so that the freeness thereof is adjusted to 420 ml is defibrated to prepare a pulp dispersion having a solid pulp content of 0.3% by weight.

A succinic acid anhydride (ASA) internal-addition sizing agent (FIBRAN-81, manufactured by Nippon NSC, Ltd.) in an amount of 0.3 part by weight per 100 parts by weight of pulp solid in the pulp liquid dispersion and a cationic starch (CATO-304, manufactured by Nippon NSC, Ltd.) in an amount of 0.5 part by weight per 100 parts by weight of the pulp solid are added to this pulp liquid dispersion. The resultant solution is subjected to paper-making with a 80 mesh wire by a paper machine for experiment use manufactured by Kumagai Riki Kogyo Co., Ltd. (K.K.) in the following condition: papermaking speed: 1000 m/min and paper discharge pressure: 1.5 $kg/cm^2$. Thereafter, this set is pressed under a pressure of 10 $kg/cm^2$ for 3 minutes by an rectangular press for paper machine manufactured by Kumagai Riki Kogyo Co., Ltd. and is dried at 110° C. in the condition of 0.5 m/min by a KRK rotary type drier manufactured by Kumagai Riki Kogyo Co., Ltd. to obtain base paper having a basic weight of 68 $g/m^2$.

An aqueous 5% by weight solution (surface sizing solution) including 22.5 parts by weight of oxidized starch (trade name: ACE A, manufactured by Oji Cornstarch Co., Ltd., contact angle with water: 39 degree, as a surface sizing agent), 22.5 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 40 parts by weight of a nonionic surfactant (trade name: SURFINOL 440, manufactured by Nisshin Chemicals Co., Ltd., HLB: 8) and 15 parts by weight of ammonium zirconiumcarbonate (trade name: CALTABOND, manufactured by Clariant (Japan) K.K.) is prepared. The surface sizing solution is applied to the obtained base paper such that the amount of solids to be applied to the base paper is 2 $g/m^2$ (amount of the surfactant to be provided: 0.8 $g/m^2$ and amount of ammonium zirconiumcarbonate to be provided: 0.3 $g/m^2$) by size-pressing by a testing size press manufactured by Kumagai Riki Kogyo Co., Ltd. Then, the base paper is dried at 110° C. in the condition of 0.5 m/min in a KRK rotary type drier manufactured by Kumagai Riki Kogyo Co., Ltd. to obtain a recording sheet (1) having a basic weight of 70 $g/m^2$.

<Recording Sheet (2)>

A recording sheet (2) having a basic weight of 70 $g/m^2$ is obtained in the same manner as in the production of the recording sheet (1) except that EMALEX GMS-B (manufactured by Nippon Emulsion (K.K.), HLB: 6) is used in place of SURFINOL 440 which is a nonionic surfactant in the production of the recording sheet.

<Recording Sheet (3)>

A recording sheet (3) having a basic weight of 70 $g/m^2$ is obtained in the same manner as in the production of the recording sheet (1) except that EMALEX SPIS-100 (manufactured by Nippon Emulsion (K.K.), HLB: 10) is used in place of SURFINOL 440 which is a nonionic surfactant in the production of the recording sheet.

<Recording Sheet (4)>

A recording sheet (4) having a basic weight of 70 g/$m^2$ is obtained in the same manner as in the production of the recording sheet (1) except that the surface sizing solution is altered to an aqueous 5% by weight solution (surface sizing solution) containing 12.5 parts by weight of oxidized starch (trade name: ACE A, manufactured by Oji Cornstarch Co., Ltd., contact angle with water: 39 degree, as a surface sizing agent), 12.5 parts by weight of a polyvinyl alcohol (trade name: PVA 102, manufactured by Kuraray Co., Ltd., degree of saponification: 99, degree of polymerization: 200 and contact angle with water: 64 degree, as a surface sizing agent), 60 parts by weight of monoglycidyl ether (trade name: EPIOL BE-200, manufactured by Nippon Oil & Fats Co., Ltd.) and 15 parts by weight of ammonium zirconium-carbonate (trade name: CALTABOND, manufactured by Clariant (Japan) K.K.) in the production of the recording sheet.

<Recording Sheet (5)>

A recording sheet (5) having a basic weight of 70 g/$m^2$ is obtained in the same manner as in the production of the recording sheet (1) except that the surface sizing solution is altered to an aqueous 5% by weight solution (surface sizing solution) containing 75 parts by weight of a polyvinyl alcohol (trade name: PVA102, manufactured by Kuraray Co., Ltd., degree of saponification: 99, degree of polymerization: 200 and contact angle with water: 64 degree) as a surface sizing agent, 10 parts by weight of monoglycidyl ether (trade name: EPIOL BE-200, manufactured by Nippon Oil & Fats Co., Ltd.) and 15 parts by weight of ammonium zirconiumcarbonate (trade name: CALTABOND, manufactured by Clariant (Japan) K.K.) in the production of the recording sheet (1).

<Recording Sheet (6)>

A recording sheet (6) having a basic weight of 69 g/$m^2$ is obtained in the same manner as in the production of the recording sheet (1) except that the surface sizing solution is altered to an aqueous 5% by weight solution (surface sizing solution) containing 30 parts by weight of oxidized starch (trade name: ACE A, manufactured by Oji Cornstarch Co., Ltd., contact angle with water: 39 degree, as a surface sizing agent), 30 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 10 parts by weight of a nonionic surfactant (trade name: SURFINOL 440, manufactured by Nisshin Chemicals Co., Ltd., HLB: 8) and 30 parts by weight of ammonium zirconiumcarbonate (trade name: CALTABOND, manufactured by Clariant (Japan) K.K.), and the amount of solids to be applied to the base paper is changed to 1 g/$m^2$ (amount of the surfactant to be provided: 0.1 g/$m^2$ and amount of ammonium zirconiumcarbonate to be provided: 0.3 g/$m^2$) in the production of the recording sheet.

<Recording Sheet (7)>

A recording sheet (7) having a basic weight of 70 g/$m^2$ is obtained in the same manner as in the production of the recording sheet (1) except that the surface sizing solution is altered to an aqueous 5% by weight solution (surface sizing solution) containing 12.5 parts by weight of oxidized starch (trade name: ACE A, manufactured by Oji Cornstarch Co., Ltd., contact angle with water: 39 degree, as a surface sizing agent), 12.5 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 60 parts by weight of a nonionic surfactant (trade name: SURFINOL 440, manufactured by Nisshin Chemicals Co., Ltd., HLB: 8) and 15 parts by weight of ammonium zirconiumcarbonate (trade name: CALTABOND, manufactured by Clariant (Japan) K.K.) in the production of the recording sheet.

<Recording Sheet (8)>

A recording sheet (8) having a basic weight of 70 g/$m^2$ is obtained in the same manner as in the production of the recording sheet (1) except that the surface sizing solution is altered to an aqueous 5% by weight solution (surface sizing solution) containing 17.5 parts by weight of oxidized starch (trade name: ACE A, manufactured by Oji Cornstarch Co., Ltd., contact angle with water: 39 degree, as a surface sizing agent), 17.5 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 20 parts by weight of a nonionic surfactant (trade name: SURFINOL 440, manufactured by Nisshin Chemicals Co., Ltd., HLB: 8), 30 parts by weight of monoglycidyl ether (trade name: EPIOL BE-200, manufactured by Nippom Oil & Fats Co., Ltd.) and 15 parts by weight of ammonium zirconiumcarbonate (trade name: CALTABOND, manufactured by Clariant (Japan) K.K.), and the amount of solids to be applied to the base sheet is changed to 2 g/$m^2$ in the production of the recording sheet.

<Recording Sheet (9)>

A recording sheet (9) having a basic weight of 70 g/$m^2$ is obtained in the same manner as in the production of the recording sheet (1) except that the surface sizing solution is altered to an aqueous 5% by weight solution (surface sizing solution) containing 10 parts by weight of oxidized starch (trade name: ACE A, manufactured by Oji Cornstarch Co., Ltd., contact angle with water: 39 degree, as a surface sizing agent), 10 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 40 parts by weight of a nonionic surfactant (trade name: SURFINOL 440, manufactured by Nisshin Chemicals Co., Ltd., HLB: 8) and 40 parts by weight of ammonium zirconiumcarbonate (trade name: CALTABOND, manufactured by Clariant (Japan) K.K.) in the production of the recording sheet.

<Recording Sheet (10)>

A recording sheet (10) having a basic weight of 70 g/$m^2$ is obtained in the same manner as in the production of the recording sheet (9) except that a polycarbodiimide (trade name: CARBODILIGHT V-02-L2, manufactured by Nisshinbo Industries Ltd.) is used in place of ammonium zirconiumcarbonate in the production of the recording sheets.

<Recording Sheet (11)>

A recording sheet (11) having a basic weight of 70 g/$m^2$ is obtained in the same manner as in the production of the recording sheet (9) except that a polyglycidyl ether (trade name: EPIOL E-1000, manufactured by Nippon Oil & Fats Co., Ltd.) is used in place of ammonium zirconiumcarbonate in the production of the recording sheet.

<Recording Sheet (12)>

A recording sheet (12) having a basic weight of 69 $g/m^2$ is obtained in the same manner as in the production of the recording sheet (1) except that the surface sizing solution is altered to an aqueous 5% by weight solution (surface sizing solution) containing 40 parts by weight of oxidized starch (trade name: ACE A, manufactured by Oji Cornstarch Co., Ltd., contact angle with water: 39 degree, as a surface sizing agent), 40 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 10 parts by weight of a nonionic surfactant (trade name: SURFINOL 440, manufactured by Nisshin Chemicals Co., Ltd., HLB: 8) and 10 parts by weight of ammonium zirconiumcarbonate (trade name: CALTABOND, manufactured by Clariant (Japan) K.K.), and the amount of solids to be applied to the base sheet is changed to 1 $g/m^2$ (amount of the surfactant to be provided: 0.1 $g/m^2$ and amount of ammonium zirconiumcarbonate to be provided: 0.1 $g/m^2$) in the production of the recording sheet.

<Recording Sheet (13)>

A recording sheet (13) having a basic weight of 69 $g/m^2$ is obtained in the same manner as in the production of the recording sheet (1) except that the surface sizing solution is altered to an aqueous 5% by weight solution (surface sizing solution) containing 48 parts by weight of oxidized starch (trade name: ACE A, manufactured by Oji Cornstarch Co., Ltd., contact angle with water: 39 degree, as a surface sizing agent), 48 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 3 parts by weight of a nonionic surfactant (trade name: SURFINOL 440, manufactured by Nisshin Chemicals Co., Ltd., HLB: 8) and 1 part by weight of ammonium zirconiumcarbonate (trade name: CALTABOND, manufactured by Clariant (Japan) K.K.), and the amount of solids to be applied to the base sheet is changed to 1 $g/m^2$ (amount of the surfactant to be provided: 0.01 $g/m^2$ and amount of ammonium zirconiumcarbonate to be provided: 0.01 $g/m^2$) in the production of the recording sheet.

<Recording Sheet (14)>

A recording sheet (14) having a basic weight of 71 $g/m^2$ is obtained in the same manner as in the production of the recording sheet (1) except that the surface sizing solution is altered to an aqueous 5% by weight solution (surface sizing solution) containing 10 parts by weight of oxidized starch (trade name: ACE A, manufactured by Oji Cornstarch Co., Ltd., contact angle with water: 39 degree, as a surface sizing agent), 10 parts by weight of a polyvinyl alcohol (trade name: PVA 102, manufactured by Kuraray Co., Ltd., degree of saponification: 99, degree of polymerization: 200 and contact angle with water: 64 degree, as a surface sizing agent), 80 parts by weight of a nonionic surfactant (trade name: SURFINOL 440, manufactured by Nisshin Chemicals Co., Ltd., HLB: 8) and 0.5 parts by weight of ammonium zirconiumcarbonate (trade name: CALTABOND, manufactured by Clariant (Japan) K.K.), and the amount of solids to be applied to the base sheet is changed to 2.5 $g/m^2$ (amount of the surfactant to be provided: 2.0 $g/m^2$ and amount of ammonium zirconiumcarbonate to be provided: 0.02 $g/m^2$) in the production of the recording sheet.

<Recording Sheet (15)>

A recording sheet (15) having a basic weight of 69 $g/m^2$ is obtained in the same manner as in the production of the recording sheet (13) except that a polyglycidyl ether (trade name: EPIOL BE-200, manufactured by Nippon Oil & Fats Co., Ltd.) is used in place of the nonionic surfactant in the production of the recording sheet.

<Recording Sheet (16)>

A recording sheet (16) having a basic weight of 69 $g/m^2$ is obtained in the same manner as in the production of the recording sheet (14) except that a monoglycidyl ether (trade name: EPIOL BE-200, manufactured by Nippon Oil & Fats Co., Ltd.) is used in place of the nonionic surfactant in the production of the recording sheet.

<Recording Sheet (17)>

A recording sheet (17) having a basic weight of 71 $g/m^2$ is obtained in the same manner as in the production of the recording sheet (1) except that the surface sizing solution is altered to an aqueous 27% by weight solution (surface sizing solution) containing only ammonium zirconiumcarbonate (trade name: CALTABOND, manufactured by Clariant (Japan) K.K.), and the amount of solids to be applied to the base sheet is changed to 3.2 $g/m^2$ (amount of ammonium zirconiumcarbonate to be provided: 3.2 $g/m^2$) in the production of the recording sheet.

<Recording Sheet (18)>

A recording sheet (18) having a basic weight of 71 $g/m^2$ is obtained in the same manner as in the production of the recording sheet (1) except that the surface sizing solution is altered to an aqueous 5% by weight solution containing only a nonionic surfactant (EMALEX RWL-150, manufactured by Nippon Emulsion (K.K.), HLB: 12) and the amount of solids to be applied to the base sheet is changed to 2.5 $g/m^2$ (amount of the surfactant to be provided: 2.5 $g/m^2$) in the production of the recording sheet.

<Recording Sheet (19)>

A recording sheet (19) having a basic weight of 69 $g/m^2$ is obtained in the same manner as in the production of the recording sheet (1) except that the surface sizing solution is altered to an aqueous 5% by weight solution (surface sizing solution) containing 15 parts by weight of oxidized starch (trade name: ACE A, manufactured by Oji Cornstarch Co., Ltd., contact angle with water: 39 degree, as a surface sizing agent), 15 parts by weight of a polyvinyl alcohol (trade name: PVA102, manufactured by Kuraray Co., Ltd., degree of saponification: 99, degree of polymerization: 200 and contact angle with water: 64 degree, as a surface sizing agent), 30 parts by weight of ammonium zirconiumcarbonate (trade name: CALTABOND, manufactured by Clariant (Japan) K.K.), and 40 parts by weight of a nonionic surfactant (EMALEX RWL-150, manufactured by Nippon Emulsion (K.K.), HLB: 12) and the amount of solids to be applied to the base sheet is changed to 1.0 $g/m^2$ (amount of the surfactant to be provided: 0.4 $g/m^2$ and amount of ammonium zirconiumcarbonate to be provided: 0.3 $g/m^2$) in the production of the recording sheet (1).

<Recording Sheet (20)>

Green 100 paper (medium quality paper, free of surface sizing agent) manufactured by Fuji Xerox Office Supply Co., Ltd. is used as a recording sheet (20) as it is.

<Recording Sheet (21)>

A water-dispersion-type copolymer polyester resin liquid dispersion (BIRONAL MD-1200 liquid dispersion having a solid content of 5% by weight, BIRONAL MD-1200 being manufactured by Toyobo Co., Ltd.) is applied to both sides of Green 100 paper (medium quality paper) manufactured by Fuji Xerox Office Supply Co., Ltd. by size-pressing using a testing size press manufactured by Kumagai Riki Kogyo Co., Ltd. such that the amount of the coating is 2 $g/m^2$ as dry weight. The coated paper is then dried at 140° C. in the condition of 0.5 m/min in a KRK rotary type drier manufactured by Kumagai Riki Kogyo Co., Ltd. to obtain a recording sheet (21) having a basic weight of 70 $g/m^2$.

<Recording Sheet (22)>

An aqueous urethane resin solution (trade name: RESAMINE w W-100, manufactured by Dainichiseika Color & Chemicals Mfg. Co., Ltd., aqueous polyurethane) is applied to both sides of Green 100 paper (medium quality paper) manufactured by Fuji Xerox Office Supply Co., Ltd. by size-pressing using a testing size press manufactured by Kumagai Riki Kogyo Co., Ltd. such that the amount of the coating is 2 $g/m^2$ as dry weight. The coated paper is then dried at 140° C. in the condition of 0.5 m/min in a KRK rotary type drier manufactured by Kumagai Riki Kogyo Co., Ltd. to obtain a recording sheet (22) having a basic weight of 71 $g/m^2$.

<Recording Sheet (23)>

An aqueous polyvinyl alcohol solution (aqueous solution containing 1% by weight of a polyvinyl alcohol PVA124 manufactured by Kuraray Co., Ltd. as a solid) is applied to both sides of Green 100 paper (medium quality paper) manufactured by Fuji Xerox Office Supply Co., Ltd. by size-pressing using a testing size press manufactured by Kumagai Riki Kogyo Co., Ltd. such that the amount of the coating is 5 $g/m^2$ as dry weight. The coated paper is then dried at 140° C. in the condition of 0.5 m/min in a KRK rotary type drier manufactured by Kumagai Riki Kogyo Co., Ltd. to obtain a recording sheet (23) having a basic weight of 73 $g/m^2$.

<Recording Sheet (24)>

An aqueous cationized cellulose solution (aqueous solution containing 1% by weight of cationized cellulose manufactured by Daicel Chemical Industries, Ltd. as a solid) is applied to both surfaces of Green 100 paper (medium quality paper) manufactured by Fuji Xerox Office Supply Co., Ltd. by size-pressing using a testing size press manufactured by Kumagai Riki Kogyo Co., Ltd. such that the amount of the coating is 5 $g/m^2$ as dry weight. The coated paper is then dried at 140° C. in the condition of 0.5 m/min in a KRK rotary type drier manufactured by Kumagai Riki Kogyo Co., Ltd. to obtain a recording sheet (24) having a basic weight of 73 $g/m^2$.

The structure and characteristic values of each recording sheet are shown collectively in Tables 1 and 2.

TABLE 1

| | Surfactant | | Compound (P) | Compound (S) | | Thermoplastic material, Heat-curable material | |
|---|---|---|---|---|---|---|---|
| | HLB | Provided amount ($g/m^2$) | Provided amount ($g/m^2$) | Type | Provided amount ($g/m^2$) | Type | Provided amount ($g/m^2$) |
| Recording sheet (1) | 8 | 0.8 | — | Ammonium zirconiumcarbonate | 0.3 | — | — |
| Recording sheet (2) | 6 | 0.8 | — | Ammonium zirconiumcarbonate | 0.3 | — | — |
| Recording sheet (3) | 10 | 0.8 | — | Ammonium zirconiumcarbonate | 0.3 | — | — |
| Recording sheet (4) | — | — | 1.2 | Ammonium zirconiumcarbonate | 0.3 | — | — |
| Recording sheet (5) | — | — | 0.2 | Ammonium zirconiumcarbonate | 0.3 | — | — |
| Recording sheet (6) | 8 | 0.1 | — | Ammonium zirconiumcarbonate | 0.3 | — | — |
| Recording sheet (7) | 8 | 1.2 | — | Ammonium zirconiumcarbonate | 0.3 | — | — |
| Recording sheet (8) | 8 | 0.4 | 0.6 | Ammonium zirconiumcarbonate | 0.3 | — | — |
| Recording sheet (9) | 8 | 0.8 | — | Polycarbodiimide | 0.8 | — | — |
| Recording sheet (10) | 8 | 0.8 | — | Ammonium zirconiumcarbonate | 0.8 | — | — |
| Recording sheet (11) | 8 | 0.8 | — | Diglycidyl ether | 0.8 | — | — |
| Recording sheet (12) | 8 | 0.1 | — | Ammonium zirconiumcarbonate | 0.1 | — | — |
| Recording sheet (13) | 8 | 0.01 | — | Ammonium zirconiumcarbonate | 0.01 | — | — |
| Recording sheet (14) | 8 | 2.0 | — | Ammonium zirconiumcarbonate | 0.02 | — | — |
| Recording sheet (15) | — | — | 0.03 | Ammonium zirconiumcarbonate | 0.01 | — | — |
| Recording sheet (16) | — | — | 2.0 | Ammonium zirconiumcarbonate | 0.02 | — | — |
| Recording sheet (17) | — | — | — | Ammonium zirconiumcarbonate | 3.2 | — | — |
| Recording sheet (18) | 12 | 2.5 | — | — | — | — | — |
| Recording sheet (19) | 2 | 0.4 | — | Ammonium zirconiumcarbonate | 0.3 | — | — |
| Recording sheet (20) | — | — | — | — | — | — | — |
| Recording | — | — | — | — | — | Water dispersion | 2.0 |

TABLE 1-continued

| | Surfactant | | Compound (P) | Compound (S) | | Thermoplastic material, Heat-curable material | |
|---|---|---|---|---|---|---|---|
| | HLB | Provided amount (g/m$^2$) | Provided amount (g/m$^2$) | Type | Provided amount (g/m$^2$) | Type | Provided amount (g/m$^2$) |
| sheet (21) | | | | | | polyester resin | |
| Recording sheet (22) | — | — | — | — | — | Aqueous polyurethane | 2.0 |
| Recording sheet (23) | — | — | — | — | — | Polyvinyl alcohol | 5.0 |
| Recording sheet (24) | — | — | — | — | — | Cationic cellulose | 5.0 |

TABLE 2

| | Water retentivity (%) | Wet tensile strength residual ratio in a CD (%) | Young's modulus (N/mm$^2$) | Thickness (mm) | Young's modulus × thickness$^3$ (N · mm) | Air permeability (s) | Degree of CD shrink | Surface resistivity (Ω · cm$^2$)/ Volume resistivity (Ω · cm) |
|---|---|---|---|---|---|---|---|---|
| Recording sheet (1) | 89 | 9 | 2400 | 0.095 | 2.1 | 20 | 0.45 | $1.0 \times 10^{10}/1.0 \times 10^{11}$ |
| Recording sheet (2) | 87 | 9 | 2400 | 0.095 | 2.1 | 20 | 0.45 | $1.0 \times 10^{10}/1.0 \times 10^{11}$ |
| Recording sheet (3) | 90 | 9 | 2400 | 0.095 | 2.1 | 20 | 0.45 | $1.0 \times 10^{10}/1.0 \times 10^{11}$ |
| Recording sheet (4) | 75 | 10 | 2500 | 0.095 | 2.1 | 20 | 0.43 | $1.0 \times 10^{10}/1.0 \times 10^{11}$ |
| Recording sheet (5) | 85 | 17 | 3300 | 0.095 | 2.8 | 20 | 0.54 | $1.0 \times 10^{10}/1.0 \times 10^{11}$ |
| Recording sheet (6) | 90 | 15 | 3000 | 0.095 | 2.6 | 20 | 0.54 | $1.0 \times 10^{10}/1.0 \times 10^{11}$ |
| Recording sheet (7) | 82 | 7 | 2300 | 0.095 | 2.0 | 20 | 0.43 | $1.0 \times 10^{10}/1.0 \times 10^{11}$ |
| Recording sheet (8) | 80 | 9 | 2400 | 0.095 | 2.1 | 20 | 0.48 | $1.0 \times 10^{10}/1.0 \times 10^{11}$ |
| Recording sheet (9) | 75 | 15 | 3000 | 0.095 | 2.6 | 20 | 0.45 | $1.0 \times 10^{10}/1.0 \times 10^{11}$ |
| Recording sheet (10) | 65 | 17 | 3200 | 0.095 | 2.7 | 20 | 0.45 | $1.0 \times 10^{10}/1.0 \times 10^{11}$ |
| Recording sheet (11) | 80 | 15 | 3000 | 0.095 | 2.6 | 20 | 0.45 | $1.0 \times 10^{10}/1.0 \times 10^{11}$ |
| Recording sheet (12) | 94 | 6 | 2300 | 0.095 | 2.0 | 20 | 0.56 | $1.0 \times 10^{10}/1.0 \times 10^{11}$ |
| Recording sheet (13) | 103 | 4 | 1800 | 0.095 | 1.5 | 20 | 0.62 | $1.0 \times 10^{10}/1.0 \times 10^{11}$ |
| Recording sheet (14) | 90 | 2 | 1700 | 0.095 | 1.5 | 20 | 0.44 | $1.0 \times 10^{10}/1.0 \times 10^{11}$ |
| Recording sheet (15) | 103 | 4 | 1800 | 0.095 | 1.5 | 20 | 0.62 | $1.0 \times 10^{10}/1.0 \times 10^{11}$ |
| Recording sheet (16) | 88 | 2 | 1700 | 0.095 | 1.5 | 20 | 0.43 | $1.0 \times 10^{10}/1.0 \times 10^{11}$ |
| Recording sheet (17) | 45 | 22 | 3500 | 0.095 | 3.0 | 20 | 0.58 | $1.0 \times 10^{10}/1.0 \times 10^{11}$ |
| Recording sheet (18) | 100 | 2 | 1700 | 0.095 | 1.5 | 20 | 0.42 | $1.0 \times 10^{10}/1.0 \times 10^{11}$ |
| Recording sheet (19) | 104 | 8 | 2300 | 0.095 | 2.0 | 20 | 0.48 | $1.0 \times 10^{10}/1.0 \times 10^{11}$ |
| Recording sheet (20) | 105 | 4 | 2400 | 0.095 | 2.1 | 20 | 0.62 | $1.0 \times 10^{10}/1.0 \times 10^{11}$ |
| Recording sheet (21) | 75 | 15 | 3000 | 0.095 | 2.6 | 40 | 0.54 | $1.0 \times 10^{10}/1.0 \times 10^{11}$ |
| Recording sheet (22) | 70 | 15 | 2900 | 0.095 | 2.9 | 40 | 0.54 | $1.0 \times 10^{10}/1.0 \times 10^{11}$ |
| Recording sheet (23) | 50 | 25 | 3800 | 0.097 | 3.5 | 105 | 0.58 | $1.0 \times 10^{10}/1.0 \times 10^{11}$ |
| Recording sheet (24) | 55 | 22 | 3500 | 0.095 | 3.2 | 102 | 0.6 | $1.0 \times 10^{10}/1.0 \times 10^{11}$ |

Examples 1 to 15, Comparative Examples 1 to 10

Image recording is conducted on each of the aforementioned recording sheets by an ink-jet recording system or an electrophotographic system to confirm the characteristics as a recording sheet. The recording sheets and conditions of ink-jet recording in examples and comparative example are collectively shown in Table 3.

(1) Evaluation in an Ink-Jet Recording System

Evaluation of printing is conducted at 23° C. under 50% RH, wherein a multi-pass printing thermal ink-jet recording device is used for evaluation which is provided with four recording heads and the following conditions are adopted: ink discharging nozzle pitch of the printing head: 800 dpi, number of ink discharging nozzles: 256, discharge amount: about 15 pl, the amount of ink to be provided is set to two levels, 10 ml/$m^2$ (standard) and 7.5 ml/$m^2$. The printing is carried out in one-side batch printing at a head scan speed of about 28 cm/sec.

Various evaluations after printing are carried out.

Evaluation of Curl Immediately after Printing

With a margin of 5 mm left on four sides of a postcard-size (about 100 mm×148 mm) recording sheet, a magenta 100% solid image is printed on the sheet. The degree of hanging curl which occurs immediately after printing on the side opposite to the printed surface is measured. In the evaluation, the measured values are converted into curvatures. The standard of evaluation is as follows and "B" indicates allowable level.

B: 20 $m^{-1}$ or more and less than 35 $m^{-1}$.

C: 35 $m^{-1}$ or more and less than 50 $m^{-1}$.

D: 50 $m^{-1}$ or more.

Evaluation of Cockle Immediately after Printing

A secondary color 100% solid (Blue) image of 2 cm×2 cm is printed in the center of a postcard-size recording sheet to measure the maximum height of cockle which develops immediately after printing by a laser displacement gage. The standard of evaluation is as follows and "B" indicates allowable level.

B: 1 mm or more and less than 2 mm.

C: 2 mm or more and less than 3 mm.

D: 3 mm or more.

Evaluation of Curl after Air Drying

With a margin of 5 mm left on four sides of a postcard-size recording sheet, a magenta 100% solid image is printed on the sheet and the sheet is allowed to stand in an environment of 23° C. and 50% RH with the printed side facing above. The degree of hanging curl which has developed by the time when the sheet is allowed to stand for 100 hours from the printing. In the evaluation, the measured values are converted into curl curvatures. The standard of evaluation is as follows and "B" and "C" indicate allowable levels.

B: Less than 30 $m^{-1}$.

C: 30 $m^{-1}$ or more and less than 75 $m^{-1}$.

D: 75 $m^{-1}$ or more.

Evaluation of Image Quality

An image in which 100% Yellow area and 100% Black area are adjacent to each other is printed on a postcard-size recording sheet to evaluate the boundary according to the following standard. "B" indicates allowable level.

B: Mixed color bleeding in an image does not occur and set-off is scarce.

C: Mixed color bleeding in an image occurs slightly or minor set-off is recognizable.

D: Mixed color bleeding in an image occurs or set-off is remarkable.

The above results are collectively shown in Table 3.

(2) Evaluation in an Electrophotographic System

With regard to the recording sheets (1) to (20), the following evaluation is made using DOCUPRINT C3530 manufactured by Fuji Xerox Printing Systems Co., Ltd. as an electrophotographic recording device under the condition of 22° C. and 55% RH.

With a margin of 5 mm left on four sides of a postcard-size recording sheet, a magenta 100% solid image is printed on the sheet, thereby evaluating the conveyance characteristics according to the following evaluation standard. "B" indicates allowable level.

B: There is no particular problem concerning conveyance characteristics and there is no practical problems.

C: Jamming occurs occasionally in the machine, and there are practical problems.

D: Jamming occurs frequently in the machine, and there are practical problems.

With regard to the recording sheets (21) to (24), the following evaluation is conducted using DOCUCENTER-COLOR 400CP manufactured by Fuji Xerox Co., Ltd. as an electrophotographic recording device.

With a margin of 5 mm left on four sides of a postcard-size recording sheet, a magenta 100% solid image is printed on the sheet to measure the amount of hanging curl which occurs immediately after printing. In the evaluation, the measured values are converted into curvatures. The evaluation standard is as follows. "A" and "B" are allowable levels.

A: Less than 10 $m^{-1}$.

B: 10 $m^{-1}$ or more and less than 20 $m^{-1}$.

C: 20 $m^{-1}$ or more and less than 35 $m^{-1}$.

D: 35 $m^{-1}$ or more.

The results are shown collectively in Table 3.

TABLE 3

| | Recording sheet | Ink-jet system Ink No. | Amount of ink to be provided (ml/$m^2$) | Immediately after printing Curl | Cockle | After air drying Curl | Image quality | Electrophotographic system Conveyance characteristics/ curl |
|---|---|---|---|---|---|---|---|---|
| Example 1 | (1) | Ink set 1 | 10 | B | B | B | B | B |
| Example 2 | (2) | Ink set 1 | 10 | B | B | B | B | B |
| Example 3 | (3) | Ink set 2 | 10 | B | B | B | B | B |

TABLE 3-continued

| | Recording sheet | Ink No. | Ink-jet system Amount of ink to be provided (ml/m$^2$) | Immediately after printing Curl | Immediately after printing Cockle | After air drying Curl | Image quality | Electrophotographic system Conveyance characteristics/ curl |
|---|---|---|---|---|---|---|---|---|
| Example 4 | (4) | Ink set 2 | 10 | B | B | B | B | B |
| Example 5 | (5) | Ink set 1 | 10 | B | B | B | B | B |
| Example 6 | (6) | Ink set 1 | 10 | B | B | B | B | B |
| Example 7 | (7) | Ink set 1 | 10 | B | B | B | B | B |
| Example 8 | (8) | Ink set 1 | 10 | B | B | B | B | B |
| Example 9 | (9) | Ink set 1 | 10 | B | B | B | B | B |
| Example 10 | (10) | Ink set 1 | 10 | B | B | B | B | B |
| Example 11 | (11) | Ink set 1 | 10 | B | B | B | B | B |
| Example 12 | (12) | Ink set 1 | 10 | B | B | B | B | B |
| Example 13 | (1) | Ink set 1 | 7.5 | B | B | B | B | B |
| Example 14 | (21) | Ink set 1 | 10 | B | B | C | B | B |
| Example 15 | (22) | Ink set 1 | 10 | B | B | C | B | B |
| Comparative Example 1 | (13) | Ink set 1 | 10 | D | D | D | B | B |
| Comparative Example 2 | (14) | Ink set 1 | 7.5 | B | B | C | D | D |
| Comparative Example 3 | (15) | Ink set 1 | 10 | D | D | D | B | B |
| Comparative Example 4 | (16) | Ink set 1 | 10 | B | B | C | D | D |
| Comparative Example 5 | (17) | Ink set 2 | 10 | C | C | C | D | D |
| Comparative Example 6 | (18) | Ink set 2 | 10 | D | D | D | B | D |
| Comparative Example 7 | (19) | Ink set 2 | 10 | D | D | B | B | B |
| Comparative Example 8 | (20) | Ink set 1 | 10 | D | D | D | B | B |
| Comparative Example 9 | (23) | Ink set 1 | 10 | C | C | B | D | B |
| Comparative Example 10 | (24) | Ink set 1 | 10 | C | C | B | D | B |

As shown in Table 3, the recording sheets of the invention which are used in Examples are free from the development of curl and cockle after printing not only in an ink-jet recording system but also in an electrophotographic system and are also superior in image quality. On the other hand, the recording sheets of comparative examples give rise to problems such as the development of curl and degradation in image quality after printing and conveyance defects in a machine.

The invention can provide a recording sheet by which image documents of improved quality can be obtained while suppressing curl and cockle which occur immediately after printing when applied to inkjet recording. Thereby, duplex printing is possible curl and cockle which occur after air drying are also suppressed. Also no image transfer inferior occurs when the recording sheet is used for an electrophotographic system. Therefore, the sheet can be utilized in both the ink-jet and electrophotographic systems. The invention also provides an image recording method which uses the recording sheet.

What is claimed is:

1. A recording sheet comprising a cellulose pulp, wherein a water retention value C of the sheet according to the following formula (1) is 50 to 100% and a wet tensile strength residual ratio R of the sheet in CD according to the following formula (2) is 5 to 20%:

$$\text{Water retention value } C(\%)=\{(A-B)/B\}\times 100 \qquad \text{Formula (1)}$$

$$\text{Wet tensile strength residual ratio } R(\%) \text{ in } CD=(Sw/S)\times 100 \qquad \text{Formula (2)}$$

wherein in Formula (1), A represents a weight (g) of the sheet in wet state after the sheet is subjected to centrifugal dehydration and B represents an absolute dry weight (g) of the sheet; in Formula (2), Sw represents a wet tensile strength (kN/m) of the sheet and S represents a tensile strength (kN/m) of the sheet in dry state.

2. The recording sheet according to claim 1, wherein the water retention value C is 60 to 90%.

3. The recording sheet according to claim 1, wherein the wet tensile strength residual ratio R (%) in CD is 8 to 17%.

4. The recording sheet according to claim 1, wherein the sheet has a Young's modulus (N/mm$^2$)×[thickness (mm)]$^3$ of 2.0 to 10.0 N·mm.

5. The recording sheet according to claim 1, wherein the sheet has an air permeability of 10 to 100 s.

6. The recording sheet according to claim 1, wherein the sheet comprises a compound having one reactive group that reacts with an active hydrogen group of a carboxyl group or a hydroxyl group in a total amount of 0.05 to 1.5 g/m$^2$.

7. The recording sheet according to claim 6, further comprising a compound having two or more reactive groups that react with an active hydrogen group of a carboxyl group or a hydroxyl group in an amount of 0.03 to 1.0 g/m$^2$.

8. The recording sheet according to claim 6, wherein the compound having one reactive group that reacts with an active hydrogen group of a carboxyl group or a hydroxyl group is selected from a group of monoglycidyl ethers, trimethylsilylating agents, acetic acid anhydride and chromium-type water-repellents.

9. The recording sheet according to claim 1, wherein the sheet comprises a nonionic surfactant having a HLB of 6 or higher and lower than 11 in a total amount of 0.05 to 1.5 $g/m^2$.

10. The recording sheet according to claim 1, wherein the sheet comprises a heat-curable material or a thermoplastic material.

11. The recording sheet according to claim 10, wherein an amount of the heat-curable material or thermoplastic material is 0.5 to 5.0 $g/m^2$.

12. The recording sheet according to claim 1, wherein a proportion of waste pulps based on total pulps in the sheet is 50% to 100% by weight.

13. The recording sheet according to claim 1, wherein the sheet has a basic weight of 60 to 128 $g/m^2$ and a formation index of 10 to 50.

14. The recording sheet according to claim 1, wherein the sheet has a surface resistance of $1.0\times10^9$ to $1.0\times10^{11}$ $\Omega/cm^2$.

15. The recording sheet according to claim 1, wherein the sheet has a volume resistivity of $1.3\times10^{10}$ to $1.6\times10^{11}$ $\Omega/cm$.

16. The recording sheet according to claim 1, wherein the sheet has a fiber orientation ratio of 1.0 to 1.55.

17. An ink-jet image recording method comprising discharging ink droplets onto a recording sheet of claim 1 to form an image on the sheet.

18. The method according to claim 17, wherein the ink comprises a colorant, an anionic compound, and a water-soluble organic solvent.

19. An electrophotographic image recording method comprising: charging a surface of an electrostatic latent image holding member; exposing the surface of the electrostatic latent image holding member to form an electrostatic latent image; developing the electrostatic latent image formed on the surface of the electrostatic latent image holding member by using a developer to form a toner image; transferring the toner image onto a surface of the recording sheet of claim 1; and fixing the toner image on the surface of the recording sheet.

20. The method according to claim 19, wherein the sheet has a surface resistance of $1.0\times10^9$ to $1.0\times10^{11}$ $\Omega/cm^2$ and a volume resistivity of $1.3\times10^{10}$ to $1.6\times10^{11}$ $\Omega/cm$.

* * * * *